(12) United States Patent
Cho et al.

(10) Patent No.: US 10,534,842 B2
(45) Date of Patent: Jan. 14, 2020

(54) SYSTEMS AND METHODS FOR CREATING, EDITING AND PUBLISHING CROSS-PLATFORM INTERACTIVE ELECTRONIC WORKS

(71) Applicant: Inkling Systems, Inc., San Francisco, CA (US)

(72) Inventors: Peter S. Cho, San Francisco, CA (US); Joyce Myra Croft, San Francisco, CA (US); Robert Cromwell, San Francisco, CA (US); Joshua John Forman, San Francisco, CA (US); Thomas Charles Genoni, San Francisco, CA (US); Christopher William Hunt, San Francisco, CA (US); Avi Itskovich, Ottawa (CA); Jessica Summer Jenkins, San Francisco, CA (US); Kerryck Arthur Clemens Jones, San Francisco, CA (US); Arthur Kopatsy, San Francisco, CA (US); Eric Todd Lovett, Palo Alto, CA (US); Olof Alexander Mathe, San Francisco, CA (US)

(73) Assignee: INKLING SYSTEMS, INC., San Francisco, CA (US)

( * ) Notice: Subject to any disclaimer, the term of this patent is extended or adjusted under 35 U.S.C. 154(b) by 694 days.

(21) Appl. No.: 13/711,583

(22) Filed: Dec. 11, 2012

(65) Prior Publication Data

US 2013/0179761 A1 Jul. 11, 2013

Related U.S. Application Data

(63) Continuation-in-part of application No. 13/353,180, filed on Jan. 18, 2012, now Pat. No. 9,317,496.

(Continued)

(51) Int. Cl.
*G06F 17/21* (2006.01)

(52) U.S. Cl.
CPC .................. *G06F 17/211* (2013.01)

(58) Field of Classification Search
CPC ............................................. G06F 17/211
See application file for complete search history.

(56) References Cited

U.S. PATENT DOCUMENTS 6,957,233 B1 * 10/2005 Beezer ................. G06F 17/241
7,630,281 B2 12/2009 Takahashi et al.
(Continued)

OTHER PUBLICATIONS

Inkling Systems, Inc.; International Application No. PCT/US12/69019 Filed Dec. 11, 203, International Search Report and Written Opinion dated Feb. 15, 2013, 10 pages.
(Continued)

*Primary Examiner* — Stephen S Hong
*Assistant Examiner* — Hope C Sheffield
(74) *Attorney, Agent, or Firm* — Ascenda Law Group, PC

(57) ABSTRACT

Systems and methods for creating, editing and publishing cross-platform interactive digital content works include a content management component configured to store portions of a digital content work and to implement version control of the digital content work; a defect tracking component configured to store a defect record related to a stored portion of the digital content work; a publication pipeline component configured to format the digital content work for publication; and a integration component configured to present a graphical user interface which allows for editing the stored portions of the digital content work, editing the defect record, and instructing the publication pipeline to format the digital content work for publication.

7 Claims, 11 Drawing Sheets

Related U.S. Application Data

(60) Provisional application No. 61/506,990, filed on Jul. 12, 2011, provisional application No. 61/570,240, filed on Dec. 13, 2011, provisional application No. 61/588,103, filed on Jan. 18, 2012.

(56) References Cited

U.S. PATENT DOCUMENTS

| | | |
|---|---|---|
| 8,122,367 B2 | 2/2012 | Krieger et al. |
| 2002/0085020 A1 | 7/2002 | Carroll, Jr. |
| 2002/0107883 A1 | 8/2002 | Schneid |
| 2002/0147748 A1* | 10/2002 | Huang .................. G06F 17/218 715/235 |
| 2002/0156813 A1* | 10/2002 | Gardner ......................... 707/513 |
| 2003/0220905 A1 | 11/2003 | Amado et al. |
| 2003/0225829 A1* | 12/2003 | Pena ................. G06F 17/30899 709/203 |
| 2004/0010753 A1* | 1/2004 | Salter ................. G06F 17/2247 715/239 |
| 2004/0181746 A1* | 9/2004 | McLure et al. ............... 715/500 |
| 2007/0135945 A1* | 6/2007 | Glenn ............................. 700/83 |
| 2007/0245018 A1 | 10/2007 | Bhola et al. |
| 2008/0235276 A1* | 9/2008 | Erol et al. .................. 707/104.1 |
| 2008/0235575 A1 | 9/2008 | Weiss |
| 2008/0263438 A1* | 10/2008 | Dias et al. ..................... 715/234 |
| 2009/0006454 A1* | 1/2009 | Zarzar et al. ................. 707/102 |
| 2009/0125413 A1 | 5/2009 | Le Chevalier et al. |
| 2009/0235182 A1 | 9/2009 | Kagawa et al. |
| 2009/0259681 A1 | 10/2009 | Lubbers et al. |
| 2010/0211866 A1* | 8/2010 | Nicholas ........... G06F 17/30905 715/234 |
| 2010/0257457 A1 | 10/2010 | De Goes |
| 2010/0287188 A1* | 11/2010 | Kakar ........................... 707/769 |
| 2011/0099071 A1 | 4/2011 | Johnson |
| 2012/0030251 A1 | 2/2012 | Alfredson |
| 2013/0073957 A1 | 3/2013 | Digiantomasso et al. |

OTHER PUBLICATIONS

"International Search Report and Written Opinion", Korean Intellectual Property Office, dated Dec. 17, 2012, International Application No. PCT/US12/046102 (filed Jul. 10, 2012), 8 pgs.

Extended European Search Report dated Dec. 23, 2015, from the European Patent Office, for EP Patent Application No. 12857803.6 (Int'l filing date: Dec. 11, 2012), 7 pgs.

McFarland, "Dreamweaver CS5.5: The Missing Manual", O'Reilly Media Inc. (Jun. 25, 2011), ISBN:978-1-449-39797-5, (1210 pages).

\* cited by examiner

FIG. 3A

SYSTEMS AND METHODS FOR CREATING, EDITING AND PUBLISHING CROSS-PLATFORM INTERACTIVE ELECTRONIC WORKS

RELATED APPLICATIONS

This application (a) is a CONTINUATION-IN-PART of U.S. patent application Ser. No. 13/353,180, filed Jan. 18, 2012, which claims the priority benefit of U.S. Provisional Patent Application No. 61/506,990, filed Jul. 12, 2011, and (b) claims the priority benefit of U.S. Provisional Patent Application Nos. 61/570,240, filed Dec. 13, 2011, and 61/588,103, filed Jan. 18, 2012, all of which are hereby incorporated by reference herein in their respective entireties.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Inkling Systems, Inc., All Rights Reserved.

FIELD OF THE INVENTION

The present invention relates to systems and methods for creating, editing and publishing cross-platform interactive digital content works.

BACKGROUND

As the use of personal computing devices to read and view content becomes more commonplace, there is a growing need to provide consumers with rich, interactive content in the form of digital content works (e.g., electronic books, magazines, articles, etc.). Development of such rich content is a challenging and complicated process, often involving many authors, editors, proofers, illustrators, artists and other contributors. Conventional electronic publishing technology is limited in its ability to dynamically manipulate and modify the content, for example, in accordance with individual users' preferences and needs, during the publishing process. These challenges are only exacerbated when content other than traditional text is involved, as new media types such as animations, videos, interactive quizzes and the like do not easily fit into existing processes or work with existing publishing tools.

SUMMARY OF THE INVENTION

Systems and methods for creating, editing and publishing cross-platform interactive digital content works include a content management component configured to store portions of a digital content work and to implement version control of the digital content work; a defect tracking component configured to store a defect record related to a stored portion of the digital content work; a publication pipeline component configured to format the digital content work for publication; and an integration component configured to present a graphical user interface which allows for editing the stored portions of the digital content work, editing the defect record, and instructing the publication pipeline to format the digital content work for publication.

In one embodiment, a system configured in accordance with an embodiment of the invention includes a content-creation module configured to provide to content contributors a set of one or more content viewing and editing tools to create a target-platform-independent representation of a digital content work. The content viewing and editing tools include one or more tools configured to provide simulated representations of the digital content work in appearance and function for each of a plurality of target devices or media. The system further includes a publication module configured to produce a plurality of target platform-dependent representations of the digital content work from the target platform-independent representation of the digital content work, each target platform-dependent representation being for display on a respective one of the plurality of target devices or media. To facilitate this, the publication module is provided profiles for each target device or medium, said profiles specifying capabilities of the respective target device or medium. The publication module creates each target platform-dependent representation of the digital content work so as to be compliant with profile-specified capabilities of the target device or medium.

In some instances, the publication module may be configured to produce one or more of the target platform-dependent representations of the digital content work by including device-specific renderable objects in the one or more of the target platform-dependent representations of the digital content work. In further instances, the publication module may be configured to produce the target platform-dependent representations of the digital content work by removing or replacing content included in the target platform-independent representation of the digital content work as required for rendering environments of respective ones of the plurality of target devices or media. In still further instances, one or more of the target platform-dependent representations of the digital content work may include cross-platform compatible objects renderable by multiple ones of the target devices.

In further embodiments, the content viewing and editing tools are further configured to permit content creators to transform a static digital representation of the digital content work into a markup language representation of the digital content work by specifying mappings of portions of content from the static digital representation of the content work to a plurality of reusable patterns defining the markup language representation of the digital content work. Each of the reusable patterns defines a markup language object portion of the markup language representation of the digital content work and has a number of user-selectable configuration options.

In some cases, the content viewing and editing tools may include a graphical user interface configured to permit what-you-see-is what-you-get (WYSIWYG) editing of the markup language representation of the digital content work. The WYSIWYG editing of the markup language representation of the digital content work may include drag and drop selection of the pattens as part of the mapping of portions of content from the static digital representation of the content work to the patterns defining the markup language representation of the digital content work.

Alternatively, or in addition, the content viewing and editing tools may include a graphical user interface configured to permit editing of source code of the markup language representation of the digital content work. Further, the content viewing and editing tools may include a first viewing area for presenting the static digital representation of the digital content work, and a second viewing area for presenting a navigator for use in creating the markup language representation of the digital content work from the static digital representation of the digital content work by specifying the mappings of portions of content from the static digital representation of the content work to the patterns defining the markup language representation of the digital content work.

The content viewing and editing tools may also include a search tool that, responsive to user-designation of a markup language element, is configured to retrieve and present a set of objects of the markup language version of the digital content work within a single view on a display of a computer system, wherein each of the objects comprises a media object and, unless otherwise specified, all objects of the markup language version of the digital content work are searched for corresponding markup language elements in response to the user designation thereof. The search tool may be configured to permit filtering of the search across specified elements of the digital content work and/or to permit limiting of the search to cascading style sheet selections.

In still further embodiments, the present invention provides a method of creating a markup language representation of a digital content work. Responsive to user input, a markup language representation of a digital content work is defined as a collection of a plurality of patterns, each pattern defining a markup language object having a number of user-specified configuration options, at least some of the markup language objects including semantic metadata describing respective content included within the objects in terms of its substance rather than its form or appearance. The markup language representation of the digital content work may be published in one or more format-dependent representations for display on respective ones of a plurality of target devices or media. Publication of the markup language representation of the digital content work may include including in the one or more format-dependent representations of the digital content work both cross-platform compatible objects renderable by multiple ones of a plurality of target devices or media and device-specific renderable objects suitable for fewer than all of the target devices or media.

These and further embodiments of the invention are described in greater detail below.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3A shows a graphical user interface, according to some examples of the present disclosure.

DETAILED DESCRIPTION

Figure 1:
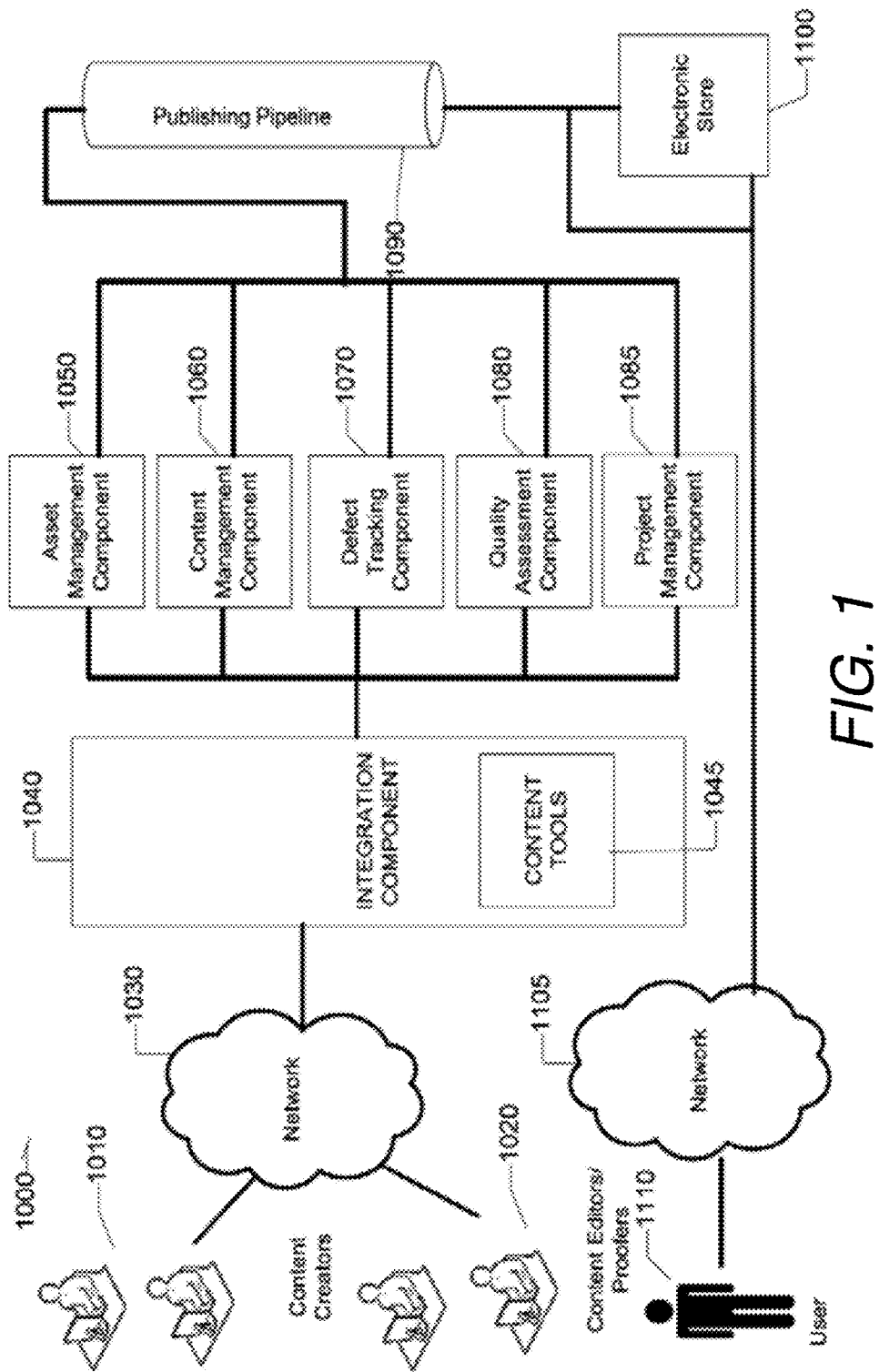
FIG. 1 shows a schematic of a publisher system, according to some examples of the present disclosure.

Disclosed in some examples are systems and methods for creating, editing and publishing cross-platform interactive digital content works. Digital content works may contain one or more text, graphic, audio, visual, and/or audiovisual elements. In some examples, the digital content work may include electronic textbooks, electronic pamphlets, electronic workbooks, electronic documents, e-books, and the like. Digital content works may be stored according to any number of or combination of electronic formats including markup language files (e.g., extensible markup language (XML), hypertext markup language (HTML), etc.) Portable Document Format (PDF), ePub (electronic publication—a free and open e-book standard by the International Digital Publishing Forum), Cascading Style Sheets (CSS), and the like), graphics interchange format (GIF), portable network graphics (PNG), joint photographic experts group format (JPEG), exchangeable image file format (EXIF), tagged image file format (TIFF), raw format, bitmap (bmp), scalable vector graphics (SVG), postscript (PS), portable document format (PDF), shockwave flash (SWF), Waveform Audio File Format (WAV) format, Motion Picture Experts Group (MPEG) I, II, III, IV, Apple lossless (m4a), and the like. A digital content work may be one or more pieces, or "portions" of digital content work that may be organized into a coherent whole. The term digital content work may thus be used to refer to both a portion of a digital content work or the entire digital content work.

In some embodiments, systems configured in accordance with the present invention includes a content creation module that provides content contributors a set of content viewing and editing tools to create a digital content work. These content viewing and editing tools may include tools configured to provide simulated representations of the digital content work, in appearance and function, for each of a plurality of target devices or media. The system may also include a publication module for producing a plurality of target platform-dependent representations of the digital content work from a target platform-independent representation of the digital content work. Each target platform-dependent representation may be for display on a respective one of the plurality of target devices or media.

To facilitate the publication, the publication module is provided profiles for each target device or medium, said profiles specifying capabilities of the respective target device or medium. The target platform-dependent representations of the digital content work are created so as to be compliant with profile-specified capabilities of the respective target device or medium. In some instances, the publication process includes altering the behavior or appearance of media objects, changing the layout of the text (e.g., based upon available screen resolution of the target device), selecting or reformatting images, video or audio to work with the target device, etc. Where necessary, content that may not render on a particular target device may be removed and/or replaced with alternative content, or links to online resources where users may view such content. One or more of the target platform-dependent representations of the digital content work may include cross-platform compatible objects renderable by multiple ones of the target devices In further embodiments, the content viewing and editing tools are further configured to permit content creators to transform a static digital representation of the digital content work into a markup language representation of the digital content work by specifying mappings of portions of content from the static digital representation of the content work to a plurality of reusable patterns defining the markup language representation of the digital content work. The patterns defining the markup language representation of the digital content work each may define a markup language object portion of the markup language representation of the digital content work and may, in some instances, have various user-selectable configuration options. In this way, patterns can be reused, but customized to particular requirements of a digital content work. The patterns may be stored in a pattern library. Content creators, editors, and others may browse the available patterns and select same as appropriate for the context in which they are to be used in the digital content work. Patterns may thus be regarded as customizable content templates that specify component portions of the work. For example, patterns may specify element styles (e.g., font, layout, color, etc.) for particular elements of the work.

The content creation module may include a graphical user interface that is configured to permit editors and others to drag and drop patterns from the pattern library, as needed, into appropriate locations in the markup language representation of the digital content work. By selecting portions of a static representation an original source asset (e.g., a PDF version of the work), and dragging the selected portions onto a pattern, the content defined by designated portion of the original source asset is mapped to the pattern and, thus, to the digital content work.

The graphical user interface may, in some instances, be divided into various views, each having one or more panes, different ones of which may be viewable at different times in the creation and editing process. For example, the graphical user interface may include a dashboard, configured to display projects to which a user has access. Each project may represent a different digital content work or portion thereof The dashboard may provide information maintained by project management tools, which allow users to manage the creation of multiple digital content works at the same time by setting and managing phases, deliverables and other milestones. Other views may include ones suited for editing, proofreading, inspecting source code, etc. Each view may have one or more panes, arranged in static or customizable fashions, to permit users to carry our content creation, editing and review tasks. Within the various views, popup windows may be displayed, as appropriate, to allow users to perform certain actions, customize certain features, and/or specify attributes.

The patterns defining the markup language representation of the digital content work each may be backed by schemas, which define how the markup language representation should be organized. This allows for automated validation of the digital content work. The schemas may be annotated to provide user interface hooks for pattern configuration.

Still further embodiments of the present invention provide an editing tool for creating a markup language representation of a digital content work. The editing tool may be instantiated as a user interface for a content creation and editing system and may include a first viewing area for presenting a static digital representation of the digital content work and a second viewing area for presenting a navigator for use in creating the markup language representation of the digital content work from the static digital representation of the digital content work by specifying mappings of portions of content from the static digital representation of the content work to patterns defining the markup language representation of the digital content work. The navigator may include a first portion for presenting pattern elements which collectively make up the markup language representation of the digital content work, each pattern defining a markup language object portion of the markup language representation of the digital content work and having a number of user-selectable configuration options.

Responsive to user selection of a pattern element, for example from a pattern library displayed in third viewing area of the user interface, and additional user input, a respective markup language object corresponding to one of the patterns of the pattern library may be inserted in context in the markup language representation of the digital content work. Preferably, the respective markup language object is editable without altering semantic metadata describing content which it includes.

Other tools accessible through the user interface may include a search tool that, responsive to user-designation of a markup language element, results in the display of a set of objects of a digital content work within a single view on a display of a computer system, the view presenting the pages of the digital content work, wherein each of the pages comprises a media object and, unless otherwise specified, all pages of the electronic work are searched for corresponding markup language elements in response to the user designation thereof. The search space may be filtered to specified portions of the digital content work, for example specified chapters, sections, etc. The search may be directed to CSS selectors, plain text, etc., and query results may be stored for collaboration Among the editing tools provided in the present system is a What-You-See-Is-What-You-Get (WYSIWYG) visual editor. This editor allows the display of metadata associated with a markup language object of a digital content work, the metadata being displayed in an editable form in context with the markup language object which it describes responsive to a user operation indicating an intent to edit said metadata.

A separate editing tool provides for "code mode" editing of a digital content work. In this instance, direct editing of source code comprising the digital content work is facilitated and a representation of the digital content work is provided so as to allow for real time review of the effects of the source code editing. This form of direct source code editing allows for editing at a very granular level. The code mode editor may be configured to allow for pattern insertion from a pattern library (e.g., via selection from a drop down menu, copying and pasting from a pop-up window, etc.), ensuring consistent use of style elements, etc. across an entire digital content work.

Still further embodiments of the present invention provide methods of creating a markup language representation of a digital content work that include defining, responsive to user input, a markup language representation of a digital content work as a collection of patterns, each pattern defining a markup language object having a number of user-specified configuration options. Preferably, at least some of the markup language objects include semantic metadata describing respective content included within the objects in terms of its substance rather than its form or appearance. The markup language representation of the digital content work may be published in one or more format-dependent representations for display on respective ones of a plurality of target devices or media.

The content creation, editing and publication processes facilitated by the present invention may be managed by various contributors through an integration component which may integrate the functionality of one or more other components, coordinate various activities between components, may provide a front end interface for users of the system which may integrate data from one or more of these components for presentation to the user, and may provide various content editing and creation tools. The system may also include an asset management component that allows for authors, illustrators, animators, and the like to submit, manage, and assemble contributions to a digital content work. In some examples, the system may include a content management component that may manage the electronic work once it has been assembled from the various submitted content portions. The system may also include a defect tracking component to store information on, and manage the lifecycle of, defects identified in the work. The defect tracking component may include defect identification, defect tracking, defect assignment to a particular editor or other user, and defect correction mechanisms that allow editors or other users to correct identified defects. In some examples, the defect management may be done at the issue level, rather than at the traditional document level. This may prevent a small subset of problem issues from holding up progress on other issues by allowing one editor to fix their problems in the master copy without regard to whether those assigned to other editors remain open. In yet other examples, the system may contain a quality assessment tool that can be used to automatically find defects, which may then be entered into the defect tracking component for assignment, tracking, and correction.

The system may also have publication tools to publish and distribute the digital content work to one or more electronic platforms, each having different rendering environments and therefore requiring different versions of the digital content work. Publication may thus be facilitated through the use of electronic platform profiles that specify requirements for different rendering environments and may include posting the digital content work, in various forms, to an electronic repository where it may be downloaded by end users. In other examples, publication may also include "pushing" an update to the digital content work to users who have already purchased an earlier version of the digital content work.

In some examples, the process of electronic management of the creation, editing, and publication of digital content work may be managed by, and made available and accessible to, the content contributors through the use of the front end interface provided by the integration component. The integration component allows contributors to interact with the various components through a network-based user interface. Additionally, the integration component may coordinate the various other components of the system so as to perform the various operations of the system.

The various components may allow for collaboration where multiple contributors may work on the digital content work simultaneously. The system may include mechanisms to support allowing multiple contributors to work on the content simultaneously including content merge tools. These merge tools may facilitate the merging of contributions from various content creators, editors and other contributors. In some examples, the system may include mechanisms for automatically merging the contributions.

A contributor to the digital content work may include any individual who submits a contribution to the electronic work and may include editors, proofers, publishers, authors, copyeditors, or the like. While the present specification may refer to specific types of contributors (e.g., proofers, editors, etc.) performing various tasks and using the system in various ways, it should be understood that the particular task and/or use of the system may not be limited to only the described type of contributor(s) but may be performed by any contributor.

Turning now to FIG. 1, an example system 1000 is shown. The various components of the system 1000 may be connected to each other directly or through one or more networks or networks of networks. For example, one or more content creators 1010 and one or more content editors 1020 or other contributors may utilize computing device to simultaneously interface with the system 1000 through network 1030. Network 1030 may include any electronic network that allows content creators 1010 and content editors 1020 to access the components of the system 1000. For example, one or more portions of network 1030, or network 1105 (which may be the same or different network as network 1030) may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks, or the like. While certain components of FIG. 1 may be shown as directly connected, they may also be connected through a network, such as a network which may be the same or similar to networks 1030 and 1105. For example, asset management component 1050, content management component 1060, defect tracking component 1070, quality assessment component 1080, project management component 1085, publishing pipeline 1090, electronic store 1100, and integration component 1040 may be connected directly, through a network, or through a combination of direct or network connections. Furthermore, while each component is logically separated from the other components for convenient description, some or all of the functionality of one component may be performed by a different component.

Integration component 1040 may be a network-addressable component that may provide a user interface that allows contributors, including content creators 1010 and content editors 1020, to interface with the rest of the system. In some examples, the interface may be a graphical user interface (GUI) that may allow content creators 1010 and content editors 1020 or other contributors to create, edit, merge, publish, open defects on, generate quality reports about, and manage various portions of the digital content work. Integration component 1040 may allow multiple contributors to access the same components, or even the same content portions, at the same time. Integration component 1040 may also implement one or more access controls that enable or disable users from accessing certain components or functionality of the system 1000. Integration component 1040 may establish user accounts for contributors and may enforce authentication and authorization rules to control access to integration component 1040 and/or other components of the system.

Integration component 1040 may also facilitate communication between other various components of the system 1000. For example, integration component 1040 may direct one or more of the other components to take some action, communicate with another component, relay information between components, or the like.

Integration component 1040 may provide one or more content tools 1045. Content tools 1045 may provide to content contributors a set of one or more content viewing and editing tools. For example, content tools 1045 may include HTML or other markup language editors, word processing applications, graphic design applications, or other applications. In some examples, these applications may include WYSIWYG editors, which are editing interfaces in which the content displayed on the screen during editing appears in a form closely corresponding to its appearance on the target device. In some examples, the content tools 1045 may also provide a simulated view of the content provided by the simulator (discussed below). This preview simulates how the content will look and function on a target device or medium. Content tools 1045 may be integrated with other components such that users may open defects, kick off builds, create new content, and the like from within the tools. In some examples, content tools 1045 may include web-based applications that are accessed over a network (such as network 1030). In FIG. 1 content tools 1045 are shown as part of integration component 1040, but in other examples, the content tools 1045 may be applications which are locally executable on terminals of the various contributors. These locally executable applications may communicate with the various components to perform these functions over network 1030 through integration component 1040 (or directly with the various components).

In one example, integration component 1040 may be located on one or more computer systems accessible by content creators 1010 and content editors 1020 through network 1030. In yet other examples, integration component 1040 may be locally executable on computer terminals of contributors such as content creators 1010 and editors 1020 and may utilize network 1030 to access the other components of the system 1000. In yet other examples, integration component 1040 may include components executable on both the computer terminals of content creators 1010 and editors 1020 as well as pieces accessible and executing on a remote server accessible over network 1030. Integration component 1040 may be or include various computer-executable binary files, HTML, XML, JavaScript, PHP Hypertext Processor (PHP), Asynchronous JavaScript and XML (AJAX), Common Gateway Interface (CGI), or other components.

While the various tasks herein described may be performed through an interface provided by the integration component 1040, in other examples, the individual components may provide their own interfaces which may be used along with, or supplementary to, the interface provided by the integration component 1040.

In some examples, integration component 1040 may interface with asset management component 1050 in order to facilitate the creation of the digital content work as a whole from a number of content portions (e.g., creating a textbook from the component text and illustrations). Content portions may be any audio, visual, audiovisual, text, or other content which is intended to be merged with other content portions into a digital content work. Content portions may also be referred to as "assets." Asset management component 1050 may be a network-addressable component which, in conjunction with integration component 1040, may allow for the management of the content creation process by managing the submission, modification, and integration of various component portions of the digital content work. This creation management process may include indexing and tracking submitted components, identifying missing content, assigning sections of missing content to one or more contributors, and managing the integration of submitted content into a complete or nearly complete version of the digital content work. In some examples, the asset management component 1050 may implement version tracking to track changes made to the component content portions.

In some examples, asset management component 1050 may utilize patterns, blueprints, collections of blueprints, etc. (or, more generically, templates), which may specify various component portions of the work that are required to complete the digital content work. Patterns, which are discussed more fully below, are customizable snippets of HTML/CSS useful for quickly defining portions of a digital content work. Blueprints define presentation objects, e.g., slideshows, guided tours, etc. Blueprints may be arranged in hierarchies. These templates may be submitted by contributors such as content creators 1010, content editors 1020, or any other contributor and may describe the structure of the digital content work (or a portion of it) and the location of one or more content portions, for example, chapters, chapter titles, chapter intro texts, various headings, various sub headings, subheading text, and subheading figures, etc. Each template may specify element styles (e.g., font, layout, color, etc.) for that particular element. These content portions will be tracked by the asset management component 1050. Incomplete or otherwise deficient content portions may be assigned to one or more contributors for correction or completion and submission. In some examples, the content template may allow for one or more optional features or sections. For example, the content template may allow a contributor to specify that a particular section, chapter, subheading, or the like, is optional. Missing optional features may or may not be assigned to contributors.

The asset management component 1050, in conjunction with integration component 1040, may be used to track which component portions of the electronic work have already been submitted and which have not, as well as whether submitted component portions are complete. The asset management component 1050 may also be used to track and manage requests for one or more missing or deficient component portions from one or more contributors. In some examples, the asset management component 1050 may allow for workflow management, which allows for tracking individual content portions as individual entities. Upon completion of their assigned contributions to the content, contributors may submit them through integration component 1040, which may then submit the content to the asset management component 1050.

As described, contributors may create the content using their own creation tools (such as local markup language editors and/or word processing or graphic design programs) and import the content into the system 1000 via integration component 1040, but in other examples, contributors may use content tools 1045 to create the content. For example, a user may add an asset to the content at any time by utilizing content tools 1045 provided by integration component 1040 or some other component of the system 1000.

Asset management component 1050, in conjunction with integration component 1040, may also allow contributors (e.g., content creators 1010, content editors 1020, or other contributors) to integrate the various component pieces of the content into a draft of the digital content work. In some examples, integration component 1040 or asset management component 1050 may automatically create the draft based upon the content template. In these examples, the submitted assets may be arranged as described in the template. In other examples, integration component 1040 may present a user interface, which may allow the contributor to arrange the various component content pieces according to their desired position. In some examples, creating the draft work may include concatenating and assembling the various content portions into one file (e.g., taking the disparate text, graphics, and the like and making one PDF file)—assembled and arranged as specified. In yet other examples, creating the draft work may include associating the various content portions with each other in the structure and arrangement which is specified in the template and/or the content portions themselves (e.g., a text content portion may specify a location of a graphic or drawing). In some examples this may be done through the use of markup tags (e.g., in the content portions themselves and/or in a template or outline markup) which may specify the location of one or more content portions.

Once the contributors are satisfied with the draft of the electronic work, the work may be submitted to the content management component 1060. In some examples, defect tracking through the defect tracking component 1070 may also begin. This may be done through the use of integration component 1040. Integration component 1040 may then coordinate the delivery of the content from the asset management component 1050 to the content management component 1060 (if necessary), coordinate starting of the version control of the work as a whole (in some examples, versions may be managed on the content portions and the work as a whole simultaneously), and coordinate starting the defect tracking process. Editors 1020 or other contributors may then begin editing the digital content work.

Defect tracking component 1070 may be a network-addressable component which, in conjunction with integration component 1040, may include tools which allow users to open defects, track defects, fix defects, and close defects found in a digital content work. These defects may be opened up by content proofers 1020 or other users (e.g., content creators 1010 or other contributors) by selecting or otherwise indicating a particular section of content for correction and specifying information on the defect. For example, a contributor may be reviewing the content through content tools 1045 (which may be integrated with the defect tracking component 1070). Content tools 1045 may allow users to open defects by selecting or otherwise indicating the defect in the content itself and entering information about what is defective. Content tools 1045 may then pass this information to the defect tracking component, which may open a defect. In other examples, defects may be opened by the quality assessment component 1080 as a result of automatic content checks performed by the quality assessment component 1080. The QA component may send a message to the defect tracking component 1070 with information on the defect, and the defect tracking component 1070 may open the defect.

The content tools 1045 may be further integrated with defect tracking component 1070 by providing an interface which allows an editor or other contributor to view and edit the content with information on the various defects displayed above the content to which it is associated. The content tools 1045 may show conversations about the defect, defect states, defect histories, or the like displayed above the content portion to which the defect is associated.

When a contributor uses the content tools 1045 to open a content portion, content tools 1045 may query the defect tracking component 1070 for information on any defects associated with that version of the content. Any returned defects may then be displayed along with the content. Viewing other versions may display the defects associated with those versions (a defect may be associated with a version when the defect is opened and may automatically be associated with subsequent versions of the content until the defect is marked as fixed or closed).

In other examples, the content itself may contain metadata identifying the defects in the portion of content. For example, if the content is represented by a markup file, (e.g., XML), the defect may be noted by the insertion of custom markup elements which may identify defects and their locations. The metadata may contain some or all of the defect record and may contain enough information to allow content tools 1045 to display information on the defect along with the content without having to query the defect tracking component. Once a defect is fixed, a new version of the content portion would be created which would not have the defect noted in the custom markup file and thus the defect would not be displayed. In some examples, the markup would contain enough information for content tools 1045 to display the defect, but in other examples, the markup may just be an indication of the defect (and in some examples a defect identification number) and integration component 1040 may need to request additional information from defect tracking component 1070 in order to display the defect information.

Content management component 1060 may be a network-addressable component and may integrate with integration component 1040 or other components of system 1000 to control the content making up the electronic work. This may include access control and version control. In some examples, access controls may specify which users may access the various portions of the content and also how to handle conflicts that may arise due to multiple users accessing the same portion of content. In some examples, version controls may record and track all the changes that any contributor may make to the digital content work, and provide access to prior revisions to each content portion and allow users to step through the history of each content portion by walking over the revisions. Content management component 1060 may also integrate with quality assessment component 1080 and defect tracking component 1070. For example, upon submission of a change to the content, the quality assessment component 1080 may automatically run automated reports about the quality of the content (these reports will be described later). The number of errors and warnings may be compared to the number of errors and warnings generated by the last report and a defect may be opened for any new errors or warnings in the newly-added content. The defects added may be automatically assigned to the contributor who introduced them. In other examples, the quality assessment component 1080 may verify that defects which are marked as fixed are actually fixed if they relate to a defect opened by, or as a result of, reports run by the quality assessment component. These actions may be facilitated by the content management component 1060 which may notify these components upon submission of new content.

In some examples, integration component 1040 also includes a device simulator which may provide a preview mode accessible to contributors. Since the digital content work may be targeted to multiple and disparate electronic device platforms, and since the content may not be rendered identically across disparate electronic device platforms, integration component 1040 may include a device simulator which allows the contributor to build the content locally (or allows integration component 1040 to interface with the publishing pipeline 1090 to build the content) for the particular desired target electronic device and through an emulator running in the system preview how the content will look and react to input and other stimuli. In some instances, simulation may be performed on a non-built markup. For example, HTML content may be handled in this this way. The emulator emulates the environment of the target electronic device so the contributor will have an accurate representation of how the digital content work performs on the target electronic device. In other examples, integration component 1040 may allow a contributor to build the digital content work and electronically transfer the built content to an external electronic device for testing on a real device. In some examples, the preview mode may allow a user to quickly jump between different preview versions of the rendered content. This may be useful in verifying that defects have been fixed by first viewing the version with the defect, and the version with the fix applied to ensure the defect is not present.

While in some examples the preview functionality may be a standalone portion of integration component 1040, in other examples it may be integrated into content tools 1045. In these examples, the preview mode may be accessible by a menu, toolbar, pop-up window, pop-under window, frame, button, link, or the like. In some examples, these menus, toolbars, and the like may be located in the same or different screen or frame as the content displayed by the content tools 1045. Thus, in one example, the user may be editing or viewing a content portion and then may click a button at the top of the screen to build and/or simulate the content. Users may edit and view content and then easily activate the functions of the simulator to build the content and view and interact with an accurate representation of how the digital content work looks and interacts on the target electronic device. For example, the integration component 1040 may utilize the simulator to provide a preview mode of the content to contributors.

Quality assessment component 1080 may be a network-addressable component that works with other components of system 1000 and may generate content reports or notifications which may check for various content irregularities and defects automatically, at regular intervals, or on demand. Such irregularities may be identified through comparisons of actual content schemas with expected representations of same and/or deviations from conventions or standards may be flagged. The expected representations may be derived from patterns which define the various content elements of the electronic content work. And the actual format of the content itself may be ascertained from information in the content such as markup language, metadata, formatting information (e.g., styles, font sizes, etc.), media type (e.g., text, audio, visual, etc.) and the like. If the actual format of the content is not the same as that of the pattern, then an indication may be noted on a report run by the quality assessment component 1080, or a defect may be opened in conjunction with the defect tracking component 1070. Integration component 1040 may provide a graphical user interface detailing the various findings of the quality assessment component 1080. For example, the various reports may be displayed along with the errors and warnings generated. Users may drill down into each report to see the different errors and warnings and in some examples, upon selecting a specific error or warning, may be taken to the content where the error will be displayed.

Project management component 1085 may be a network-addressable component and may integrate with integration component 1040 or other components of system 1000 to control and store data related to project management of one or more electronic works. In some examples, project management component 1085 may allow project managers to manage the lifecycle of multiple digital content works. Project management component 1085 or integration component 1040 may provide one or more graphical user interfaces which may allow project managers or other contributors to create and manage the various phases, deliverables, to-dos and the like as well as viewing the current status of each project. In some examples, the project management component 1085 or integration component 1040 may also provide a dashboard interface which may show a project manager a summary of the current status of multiple digital content works. This may allow a contributor such as a project manager to determine at a glance the status of various digital content works.

Once the content is ready for publication, one or more of the contributors may publish the digital content work. Publication (or "building" the content) is a process by which a format independent representation of the content is transformed into one or more format dependent representations of the content. For example, the content may be customized for a particular target device or devices.

This process may be done through the integration component 1040, which may prompt the individual to input a number of various options including which target platforms or formats to build the digital content work for, whether the entire work is to be built or only selected portions, and the like. Content may be built by the publishing pipeline 1090, which may convert the various digital content work pieces to a format compatible with the particular target device or medium. This conversion process may include media adaptation, changing the layout of the text based upon the characteristics of the rendering environment such as the available screen resolution, selecting or reformatting images, video or audio to work with the device, selecting one or more alternate content pieces based upon the capabilities of the device (e.g., inclusion of a particular video selected from a number of videos where the video is tailored to the performance capabilities of the machine or the video codecs or the like that are supported), and the like. In other examples, content that may not be displayed on a particular type of medium or device may be removed and replaced with alternative text, links to online resources to view such content, or the like. The publishing pipeline 1090 may have one or more profiles of various target devices and media. These profiles specify the capabilities of the media and/or device. The publishing pipeline 1090 then publishes the digital content work by comparing the various content portions against the capabilities of the media or device. If the digital content work requires device or media capabilities that are not present on the media or device, the content is removed, resized, replaced with compliant content, or the like. In some examples, the layout and pagination of the content may be changed. Text may also be adjusted so as to conform to the layout and pagination of the target media or device.

In some examples, content may be built on-demand at the request of a contributor. In other examples, the publishing pipeline 1090 may monitor the content on the content management component 1060 and build the content automatically upon occurrence of an event related to the content.

In some examples, these events can include content changes, new versions of the digital content work or a portion of the digital content work, changes to the state of one or more defects (e.g. certain defects being fixed), defect thresholds (e.g., the content is built after the total number of identified defects goes below a certain threshold), or the like.

Once the publishing pipeline 1090 has built the digital content work, the publishing pipeline may distribute the published content. In some examples, the publishing pipeline 1090 may accomplish this by interfacing with the electronic store 1100 which may then make the content available for download by the end-user 1110 on an electronic device over a network 1105. In some examples, the publishing pipeline 1090 automatically causes the electronic device of end-user 1110 to download the digital content work or updates to the digital content work. In some examples, these "push" updates may not be done through the electronic store 1100, but in other examples, the electronic store 1100 may facilitate the "push" update. Alternatively or in addition to this push model of distribution, a "pull" model may be implemented in which reader devices poll a server for updates. In some examples, where the digital content work is just being updated with new or corrected content, only portions or modules of the digital content work may be built and pushed to the electronic devices.

In other examples, where integration component 1040 includes a simulator for simulating the digital content work on a particular electronic device, the publishing pipeline 1090 may perform a test-build of the content. The built content is then delivered to integration component 1040, which displays the built content in the simulator.

In some examples the various components of system 1000 may be physically located on one or more machines, and the functions of the components may be implemented by one or more applications running on the one or more machines. Additionally, the functionality described for one or more of the components may be performed by different components than those that have been described. In examples where the functions of system 1000 are spread out across separate machines, these machines may communicate with each other through the use of direct connections, and/or a computer network such as network 1030 or 1105. In some examples, some components may be on a distributed or parallel computing platform with physical hardware located in multiple locations that communicate through a computer network and have a single interface to an external user or client such that users or clients interact with the system as if it were one logical system. In some examples, these components can be or include distributed databases. In some examples, the data stored on these distributed databases may be shared. Database sharing is a method of horizontal partitioning in a database or search engine. The basic principle is that rows of a database table are distributed across the distributed database. While some examples of system 1000 relied upon integration component 1040 coordinating among the various components or providing the interface to the other components of the system, it will be apparent to one skilled in the art with the benefit of the present disclosure that one or more of the constituent components of system 1000 may coordinate various functions on their own or have their own user interfaces separately accessible by content contributors.

Figure 2:
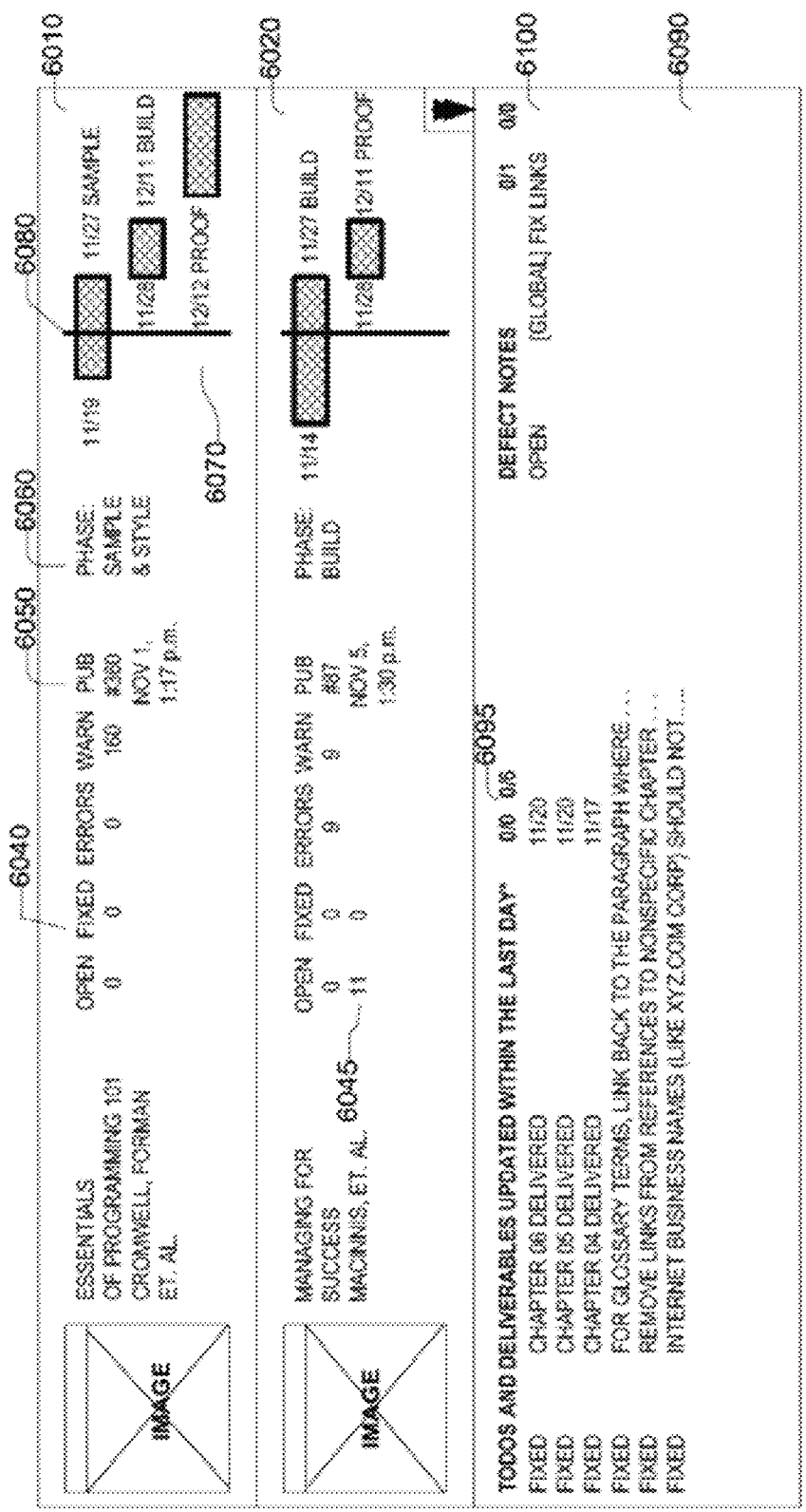
FIG. 2 shows a graphical user interface, according to some examples of the present disclosure.

The integration component 1040 may provide one or more graphical user interfaces which may integrate content and data from the various other system components. In some embodiments, the integration component may be implemented as an application programming interface (API) through which enterprise applications may access the present system. Integration component may provide an overview of projects to which users are interested in following through a dashboard interface. FIG. 2 shows an example graphical user interface of a project management dashboard 6000. The status of each of the digital content works is shown at 6010 and 6020. For each work, the number of open and fixed defects as well as the number of outstanding errors and warnings generated by the quality assessment component assigned to the user viewing the dashboard is shown at 6040. At 6045, the number of open defects and fixed defects in the project (e.g., the total number) may also be shown. The information on the last time the content work was published is shown at 6050 (e.g., the published version number and the time that version was published). The current phase of the project is shown at 6060. A Gantt chart is shown at 6070 which shows the start dates and end dates of one or more phases of the project along with a vertical line 6080 which represents the current date. In some examples each progress bar of each phase may be have an indicator within it that shows exactly how far along that phase is (e.g., if five out of ten deliverables have been delivered, the indicator would be half-way along the progress bar). Users may then compare the indicator of each phase with the line showing the current date to get an up-to-date indication of whether a phase is on schedule, behind schedule, or ahead of schedule.

At 6090 one of the projects has been expanded to show additional detail. The items shown in the additional detail section may be customized by the user to show the information the user would like to see. This may be done by specifying one or more search queries and/or filters to the various components that make up the system. For example, the user may include information from the defect tracking system such as a list of defects (shown as notes), a count of the number of defects, a breakdown of editors and their workloads, or the like. The user may also see a list of to-dos, deliverables, or the like from the project management component. The user may see information on when the digital content work was last published and for what formats. The user may also see statistics on distribution (e.g., how many downloads, how many devices an update was pushed to, and the like). The user may also see various information on the asset management system such as a list of missing assets, statistics on the assets (e.g., number of submitted, number of outstanding, and the like), workloads of the contributors, or the like. The additional detail may include any information managed by the system. In FIG. 2, the additional detail includes the status of the various deliverables and to-dos of the current phase (FIG. 2 shows the status of the deliverables and to-dos as "FIXED", with the date of completion 11/20, 11/20, 11/17 next to those deliverables). Also shown at 6095 is the number of to-dos and deliverables in this phase that are currently open and assigned to this user (0), the number of deliverables and to-dos currently open and assigned to all users in this phase (0), the total number of to-dos and deliverables in this phase fixed by this user (0), and the number of to-dos and deliverables in this phase that have been fixed by all users (6). At 6100, a custom filter is shown which displays all defect notes with the "[GLOBAL]" tag in the note text. Also shown is the total number of open defect notes assigned to this user in this phase, the number of open defect notes assigned to other users in this phase (1), the number of defects fixed by this user in this phase (0), and the number of defects fixed by all users in this phase (0). Clicking on a title may take a contributor to the home screen for a particular title. In yet other examples, the additional detail may include the displaying of activity around the content (e.g., a stream of changes related to issue fixes, content saves, comments, automated QA reports, last publish, or the like).

Figure 3A:
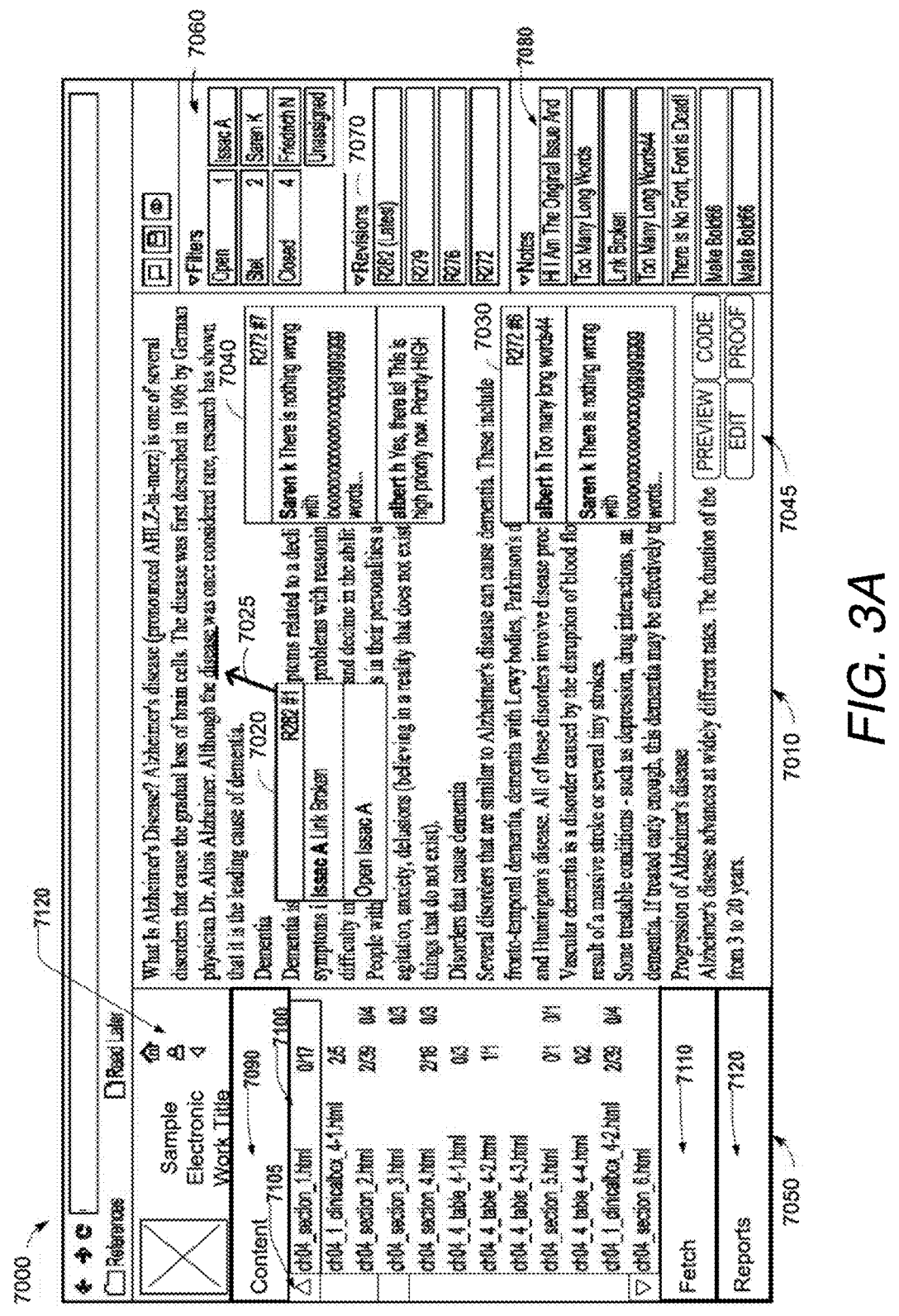

Within a project, the integration component may present users with an integrated graphical user interface, or home screen. Content tools 1045 may be integrated with the home screen. FIG. 3A shows an example of a home screen graphical user interface 7000. On the left hand side of the screen is a first panel 7050 in which are presented selectable tabs 7090, 7110 and 7120 which allow a contributor to select between viewing content portions (chapters, sections, etc.) arranged as a table of contents for the work, searching (or fetching) content portions, and viewing reports. In this example, the content tab 7090 is selected and expands to show the available content portions for viewing. In FIG. 3A, the selected portion 7100 ("ch04_section_1.html") of the content 7010 is displayed in the middle of the screen. The content portions may be displayed using the content tools 1045. Selecting the fetch tab 7110 or the reports tab 7120 may collapse the display of the available content portions and display fetch or report specific information. Each section under the content tab 7090 may also displayed with defect counts corresponding to each section. The section shows the number of open defects assigned to that particular user vs. the total number of open defects, along with the number of fixed defects assigned to this user in that section and the total number of fixed defects in that section. For example, for this particular contributor, for ch04_section_2.html, this user has two defects assigned to him/her, and there are a total of 39 outstanding defects. Additionally, there have been four previously fixed defects in this section, of which none were fixed by this user. In some examples, if there are more content portions that can fit into the content tab 7090, a user may utilize a scroll bar (such as scroll bar 7105) to see additional content portions.

In the content display 7010 (which in this instance is a center panel of the user interface), defect notes 7020, 7030, and 7040 associated with this portion of content for this version are shown integrated with the content 7010. Each note may present information from the defect record to which the note is associated, including a history of each contributor's comments about the defect (in some examples, organized as a conversation) and any state or assignment changes that have taken place. The notes can include file attachments, code snippets, and arrows or highlights pointing to the content and regarding the defect. For example, note 7020 includes an arrow 7025 drawn to a particular piece of the content. Notes may be anchored to selected content (e.g., text, graphics, videos, and the like), but also may be anchored on particular (x, y) coordinates of the content. If the content is video content or other content with multiple frames, each note may also specify a particular frame to which it applies. In addition, the notes may be grouped together or labeled so as to identify patterns or to allow changing the defect information of multiple defects at the same time (e.g. mass reassignment of defects). Selecting or clicking on a note may take the user to a detailed view of additional meta-data associated with the defect.

View selection buttons 7045 allow contributors to shift between different views or modes. The preview mode activates the simulator which shows the user the way the digital content work looks and acts on a selected target device. Animations, graphics, videos and the like appear and behave as if they were executing natively on the target device. The code mode shows the underlying source code of the content (if any). For example, if the content is stored as an XML file, the underlying XML is displayed. In some examples, users may edit the XML documents within this view. The edit mode active the integration component's inline content viewer and editors. These inline editors may include a WYSIWYG editor which may be an editing interface in which the content displayed on the screen during editing appears in a form closely corresponding to its appearance on the target device. Users may drag and drop visual elements, text boxes, and the like. The proof mode enables proofers and other editors to quickly proof all content. Proof mode is similar to preview mode except that proof mode expands and displays any hidden content and allows for proofers or other contributors to identify and raise defects by adding notes. Content may be hidden for example as answers to a quiz question, hints to a quiz answer, or the like. During proof mode, these may automatically be shown.

At the right side of the screen, in a right hand panel, a number of selectable filters are shown at 6060. These filters allow a contributor to show only a subset of the issues based on status or assignee, or other like criteria. Also at the right side of the screen a number of revisions are selectable at 7070. The system may track multiple versions of the content at once and track defects with respect to these versions. A contributor or other user may view an earlier version to view the defect in context and then move to a later version to verify that it has been fixed. As each version is browsed, the defect notes may change based on the defects in that version (i.e., a defect introduced in version 5 will not be visible when version 3 is selected—likewise a defect in version 3 that is fixed in version 5 will not be visible when viewing version 5). This is the result of the integration between the content management component 1060, the defect tracking component 1070, and integration component 1040. For example, upon selecting a previous version, the integration component 1040 contacts the content management component 1060 to request the previous version of the content. Upon receiving the previous version of the content, integration component 1040 may contact the defect tracking component to retrieve defects associated with that version. Finally, integration component 1040 may display the particular version of the content and the associated defects. Notes on the current page are also listed on the right hand side of the screen at 7080 for convenience. Icons 7120 may take contributors back to the dashboard, take the contributors to a preferences screen or the like. In some examples, contributors may create new content portions by left clicking on the list of content portions in the content tab 7090. A blank content portion may be displayed in the window 7010 and subsequently edited using the content tools 1045.

Figure 3B:
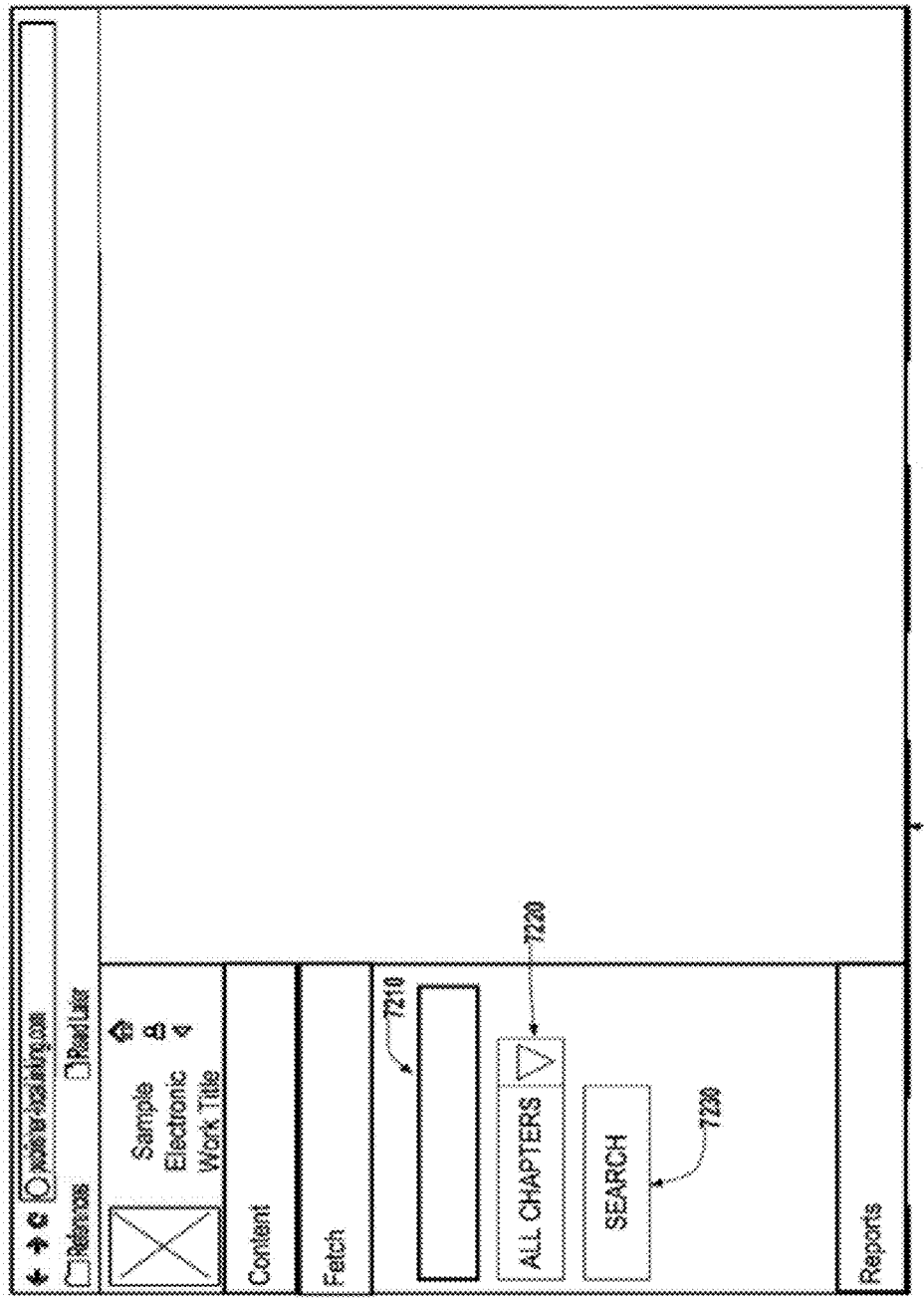
FIG. 3B shows a graphical user interface, according to some examples of the present disclosure.

Selecting tab 7110 brings up a search screen which may allow a user to "fetch," one or more content portions. This may be useful for horizontal proofing—which is where a proofer checks all content of a certain type (e.g., all "aside" boxes). An example fetch interface is shown in FIG. 3B. A search box is shown at 7210. In some examples, this search box accepts an XML element and the fetch will return any content which matches that XML element (e.g., entering 'h1 ' may display all the 'h1' elements). In other examples, the search box may be a free text search. In yet other examples, the search may be based upon cascading style sheet (CSS) selectors. These selectors may be in the form "tagname- .classname" where tagname is the first word after the opening caret ('<') in html (or some other markup) and classname is a word inside the class="<word>" html attribute. Multiple selectors separated by spaces may be used to scope the query. For example, if you wanted to query only aside elements inside paragraph tags, you could use: "p aside". The search may be on the content itself, or on the underlying code (e.g., the markup tags) or both. In yet other examples, the search terms may include searches related to data from the defect tracking tool. Thus a search may be created which would show all "figure" tags that have open defects or all "H1" tags that have open defects assigned to a particular user. Additionally, data from the content management tool may be searched as well. For example, the search results may be limited based upon the content version. Furthermore, the quality assessment component 1080 may be used as an input into the search. For example, content with defects found by the quality assessment component may be shown. Thus entering a specific search term may show results related to that search.

In still other examples, the search box may present a visual search interface which recognizes concepts as you type and allows you to select from a drop-down box a list of possible choices for those concepts. For example, entering "country" into the search box is recognized as a search regarding a particular country and the drop-down box may provide a list of countries from which to choose and search results are confined to that particular country. In some examples, the fetch interface may return results from the entire content work, but in other examples the results may be confined to one or more sections (e.g., chapters, units, or the like) by utilizing the drop down box 7220 to select one or more sections. In yet other examples, the visual search box may allow users to confine the search results to particular sections (e.g., typing in chapter may bring up a drop-down box with a list of chapters). Matching content portions may be displayed in the content pane 7240. In some examples, this may be a list of matching content, but in other examples the matching content may be displayed as a carousel where one or more inputs (e.g. a touch gesture or mouse input) may select between the various content portions. For example, to move between the first match and the second match a user may swipe the content portions. In some examples, the content in pane 7240 may be editable using integrated content tools 1045. In some examples, this may allow a user to quickly view all content of certain types for easy proofing and consistency checking (e.g., horizontal proofing). Defects may also be opened in the content pane 7240 (e.g., by right clicking or left clicking a particular portion of content and selecting an open defect option of a context sensitive menu). In some examples, the search results returned may show the open defects.

As alluded to above, to transform a static representation of a digital content work to a markup representation of the work, it is necessary to specify how different parts of the work will map onto, when converted into markup language, a set of patterns, each of which define different markup language objects. The patterns may be regarded as reusable pieces that, when assembled in a particular order (e.g., as specified by a table of contents) define the markup language representation of the digital content work. The patterns are configured to be machine-verifiable against the content to ensure instructions for assembly were followed. Examples of patterns include cards, sections, figures, lists, etc.

As used herein, the term "card" or "media card" refers to an instantiation of a constituent presentation object (e.g., an HTML object or a media object) of a digital content work. The assembly of patterns that define the digital content work may be divided into a number of content templates, or blueprints. Each blueprint may thus be regarded a markup language file. Once a blueprint is instantiated, it may be called a card. While the various blueprints (and their constituent patterns) which comprise the digital content work may be platform agnostic, the various cards formed from those blueprints may be displayed differently depending on the target rendering environment. Hence, the layout and sometimes even the constituent objects of a card may depend on the rendering environment.

Figure 4A:
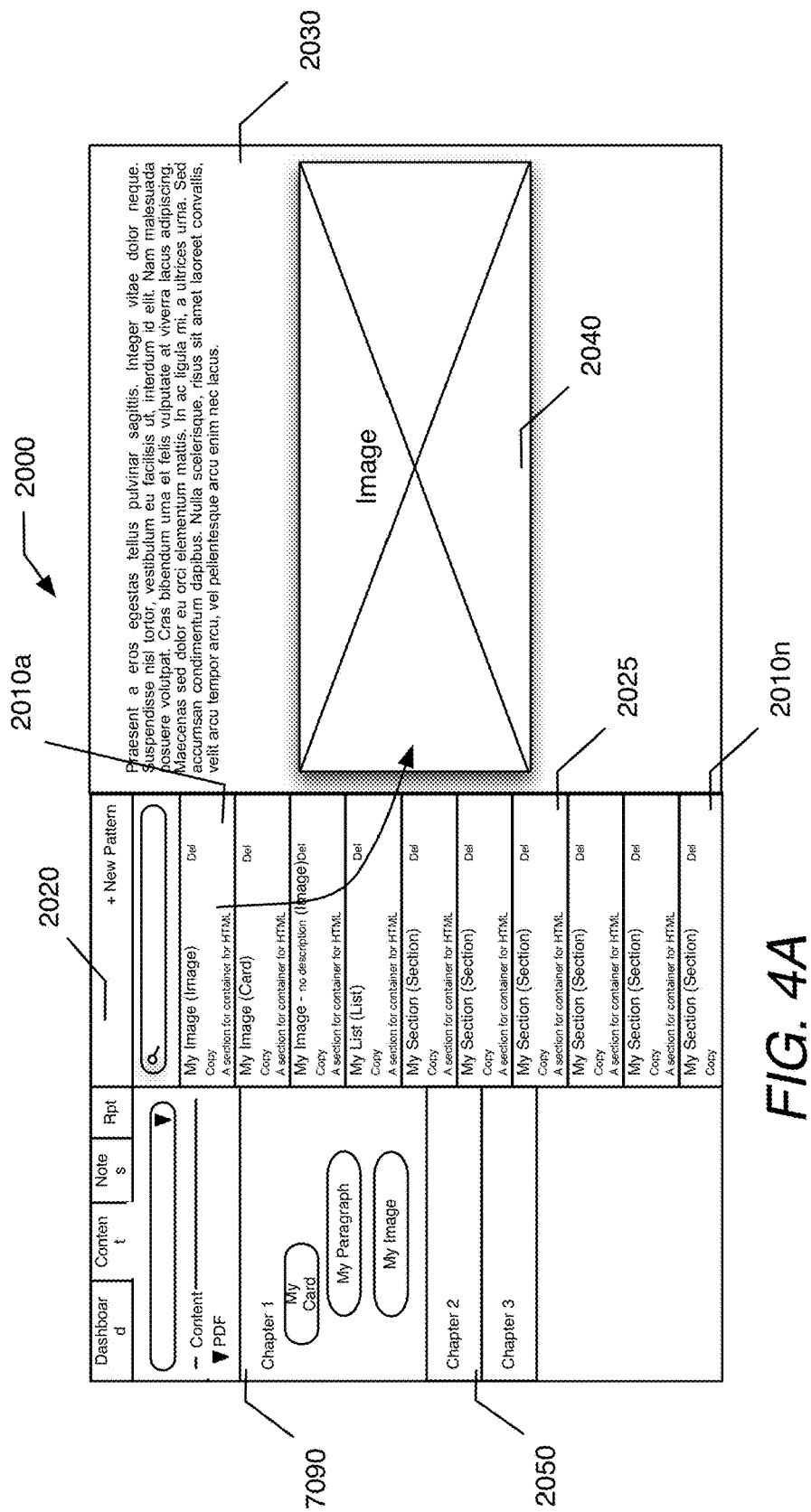
FIG. 4A illustrates an example of a user interface for creating or editing an HTML card.

FIG. 4A illustrates an example of a user interface 2000 for creating or editing an HTML card. This interface may be invoked through user selection of the edit mode, as described above. Patterns 2020*a*-2010*n* are collected into a global pattern library 2020 displayed in a first panel 2025 of the interface. Users drag patterns from the global pattern library over to a zoning document 2030, which is displayed in a second panel 2035 of the user interface and represents an original source asset PDF, and draw a zone square 2040 around the portion of the original source asset that maps to the given pattern. The user then configures the pattern by choosing different options from a user interface and/or editing subfields of the content with a WYSIWYG editor. Editing the content in this fashion does not alter the structure of the markup language object defined by the pattern or the semantic content thereof. Once a pattern is configured, the user may give it a name and add it to the project. Behind each configured pattern is a unique schema which can assert that, if the pattern is used anywhere in the digital content work, that it is being used correctly.

The user interface is arranged to allow for browsing in the global pattern library. By using configurable patterns, the total number of individual patterns can be kept to a manageable number, while still permitting flexibility of use. Once configured, patterns are converted into schemas, which define how the markup language representation of the content should be organized so it can be validated. For example, a schema can be configured to specify that certain tags are optional, that other tags must have certain attributes, etc. In one case, schemas are used to describe the markup language behind each of the patterns. The schemas may be annotated with extra information in order to provide user interface hooks necessary while configuring a pattern. In order to compile a configured pattern into a more restrictive schema, a generic pattern's schema may be extended to configure it to be more restrictive. Schemas may be written in XML or another format. Another example of WYSIWYG editing in the present interface is the use of an editable table of contents 2050. The structure of a digital content work can be edited through drag and drop operations involving the cards that make up chapters, sections, etc. of the work directly within the table of contents. In some cases this editing may be invoked by selecting an appropriate button or other interface object (not shown in this view), while in other instances the editable nature of the table of contents is inherent and need not be separately initiated. Likewise, within a table of contents, thumbnails can be uploaded, blueprints (constituent presentation objects for the digital content work) added (e.g., using drag and drop operations), Reordering of contents within the table of contents need not necessarily change the structure of any files representing the underlying objects as stored on disk.

Figure 4B:
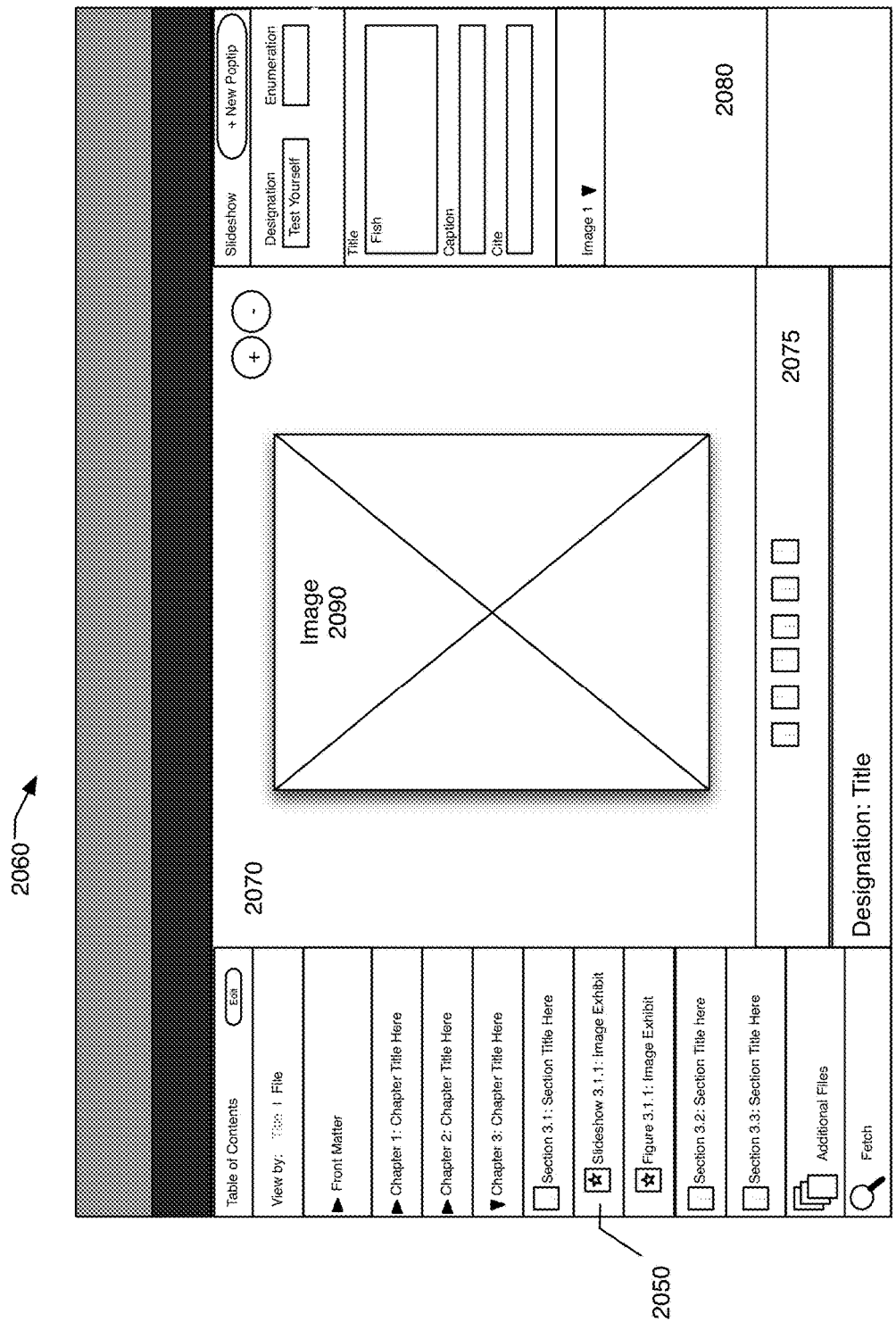
FIG. 4B illustrates an example of a user interface for creating or editing a media card.

FIG. 4B illustrates an example of a user interface 2060 for creating or editing a media card, in this instance a slideshow. As before, table of contents 2050 is presented in a left hand panel. In center panel 2070, individual media objects (e.g., images) that make up the slideshow (or other media item) are presented. For a slideshow composed of multiple images, the other images may be presented in a preview pane 2075. Left hand panel 2080 provides editing options for the slideshow images 2090; for example, a user may add titles, captions, descriptions and other metadata concerning the images in various text boxes, etc. Images themselves may be added by means of drag and drop operations (e.g., from other windows) or by uploading them from hard drives or servers.

Figure 5:
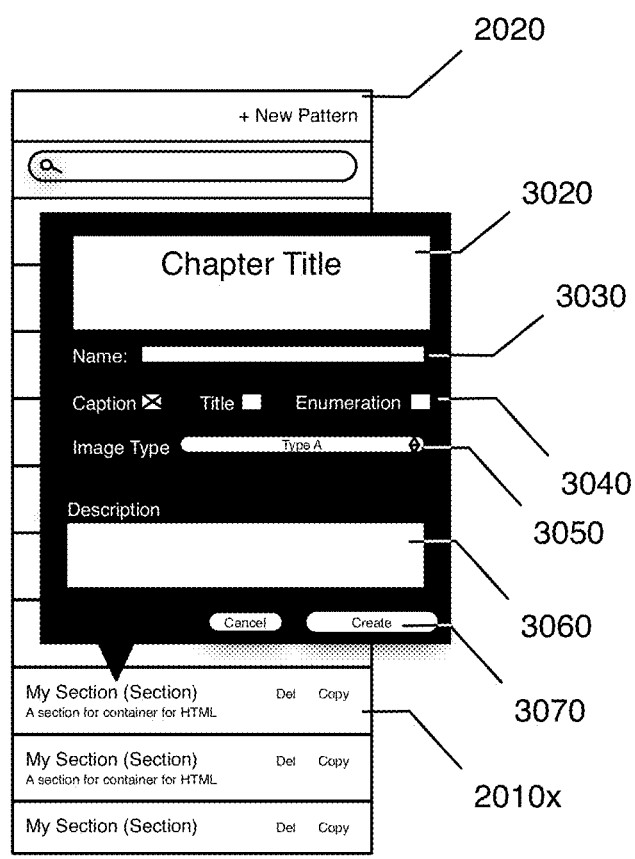
FIG. 5 illustrates an example of a user interface for configuring a pattern selected from the pattern library.

FIG. 5 illustrates an example of a user interface 3010 for configuring a pattern 2010x selected from the pattern library 2020. After patterns are created or copied, configuration options on these patterns may be used to customize them. For example, a card pattern may be configured as a Reader Introduction Card, Cultural Spread Card, etc. Configuration options may include options to configure the card's header (e.g., to specify whether the card's header bleeds to either side, whether it has a subtitle, etc.); and so on.

Within interface 3010, a preview window 3020 provides the user a visual indication of the effect of the various configuration settings. This may be illustrated using sample content or the actual content of the digital content work being edited. Also provided are facilities for naming the configured pattern 3030, specifying various options 3040, identifying image types, if applicable, 3050, and providing additional descriptions of the pattern 3060. Once configured, the pattern can be saved by selecting an appropriate button 3070 or other user interface element.

Pattern configuration may be accommodated through the use of normalized patterns into having roughly similar structural markup language definition. Different configuration options can add or remove markup language (e.g., HTML), but the markup language stays roughly in what is known as "semantic markup." Semantic markup is a term for adding markup language tags that represent what the information is, rather than what it looks like; it does not necessarily need to include presentational elements. The markup language can be used to represent the information itself, while CSS can be used to describe how the markup language should display visually. In addition, advanced CSS3 may be used to gain the advantages of consistent markup language. For example, conventional CSS tools may be used to change the ordering of how elements are shown without changing the markup. CSS pseudo-elements and the CSS "content" property may be used to inject presentational content without modifying the markup. CSS media queries may be used to lay elements out differently depending on available screen real estate and client capabilities. As a result, presentation content can be modified by using various attribute for digital content works rather than by changing the markup language itself In one embodiment, patterns may be used to provide a custom CSS Class configuration option to make this possible. For example, a user can configure a pattern for a digital content work to have a custom CSS class title to provide a desired styling hook.

The semantic markup referred to above allows for the publishing of digital content works in formats that make them useable as if they were databases (as opposed to flat digital objects). We call this "semantic publishing". In order to provide hooks onto which user interfaces and machine validation/automation can plug into, lightweight semantic metadata is added to the markup language describing the content elements of the work to establish "objects" and their properties (e.g., properties and associated facts of a particular person, place, event or other item of interest). For example, a digital content work may be semantically published in a manner configured to allow a user to search for "Abraham Lincoln". Using the metadata included in the digital content work, the platform providing access to such work may efficiently obtain all instances in the digital content work which relate to Abraham Lincoln (e.g., sections of text related to his life and presidency, his successor, and so forth). The platform may be further configured to return search results that reference content stored outside of the digital content work (e.g., on the Web, in a user's notes, in the notes of members of the user's social network, in other electronic works hosted by the platform, and so forth).

The semantic markup expresses both lower-level structural understanding (i.e. "this is a section", "that is a header", etc.) well as higher-level understanding (e.g., "this is a person", "that is a place", etc.). The semantic markup allows content creators to express types of templates so they can be easily searched during template configuration and later bound to when machine-validating template schemas. The semantic markup works for both block and inline semantic "things" (i.e. block level concepts like a "section" as well as inline-oriented things such as a "person").

Figure 6:
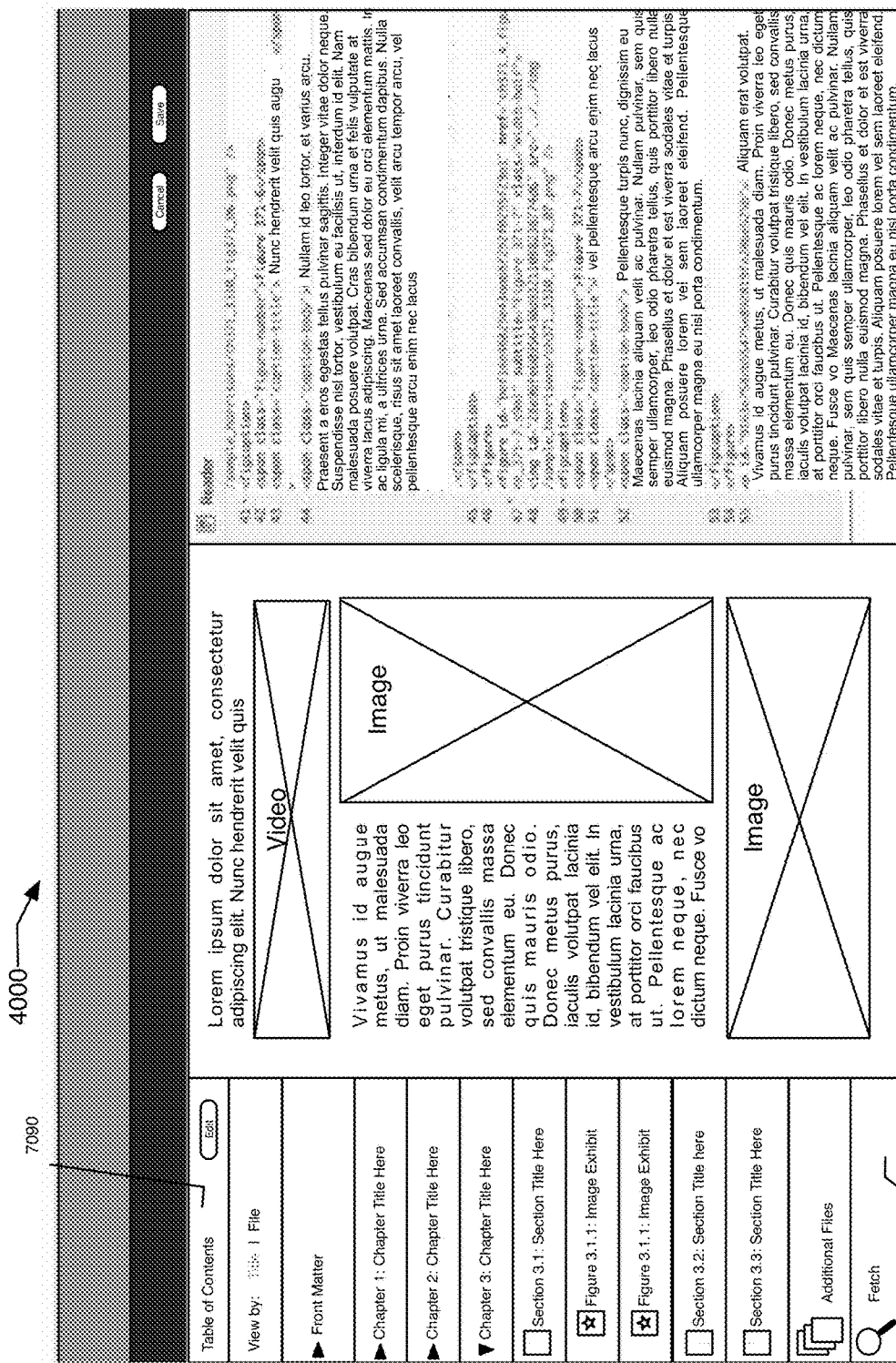
FIG. 6 illustrates an example of a user interface facilitating editing of source code for a digital content work.

In addition to WYSIWYG editors, the present invention provides user interfaces for direct editing of source code of the digital content work. FIG. 6 illustrates one example of such a user interface 4000 for "code mode" editing. This mode my be entered through user selection of the cod view from the home screen.

In this view, a representation of the markup language version of the digital content work is presented in a panel 4010 and the corresponding source code is presented in an adjacent panel 4020. As edits are made to the source code in panel 4020, the effect of those edits are rendered in real time in the representation of the digital content work shown in panel 4010. This form of direct source code editing allows for editing at a very granular level. The code mode editor may be configured to allow for pattern insertion from the pattern library (e.g., via selection from a drop down menu, copying and pasting from a pop-up window, etc.), ensuring consistent use of style elements, etc. across the entire digital content work. To assist the user in finding the exact spot which he/she wishes to edit, a focus mode is available: By clicking on an element in the left panel 4010, a cursor will advance to the relevant position within the code in the right panel 4020. Of course, some edits are best performed without code, so the WYSIWYG edit modes for objects such as image figures, slideshows and video elements are available. This way one can update card metadata (e.g., title and caption) in an easy-to-use interface, rather than in XML, and can upload images and videos directly from a hard drive or server. Image figures and slideshows can have pop tips added and edited. Slides for slideshows can be reordered, added and removed by drag and drop. For videos, one can select a poster frame.

Figure 7:
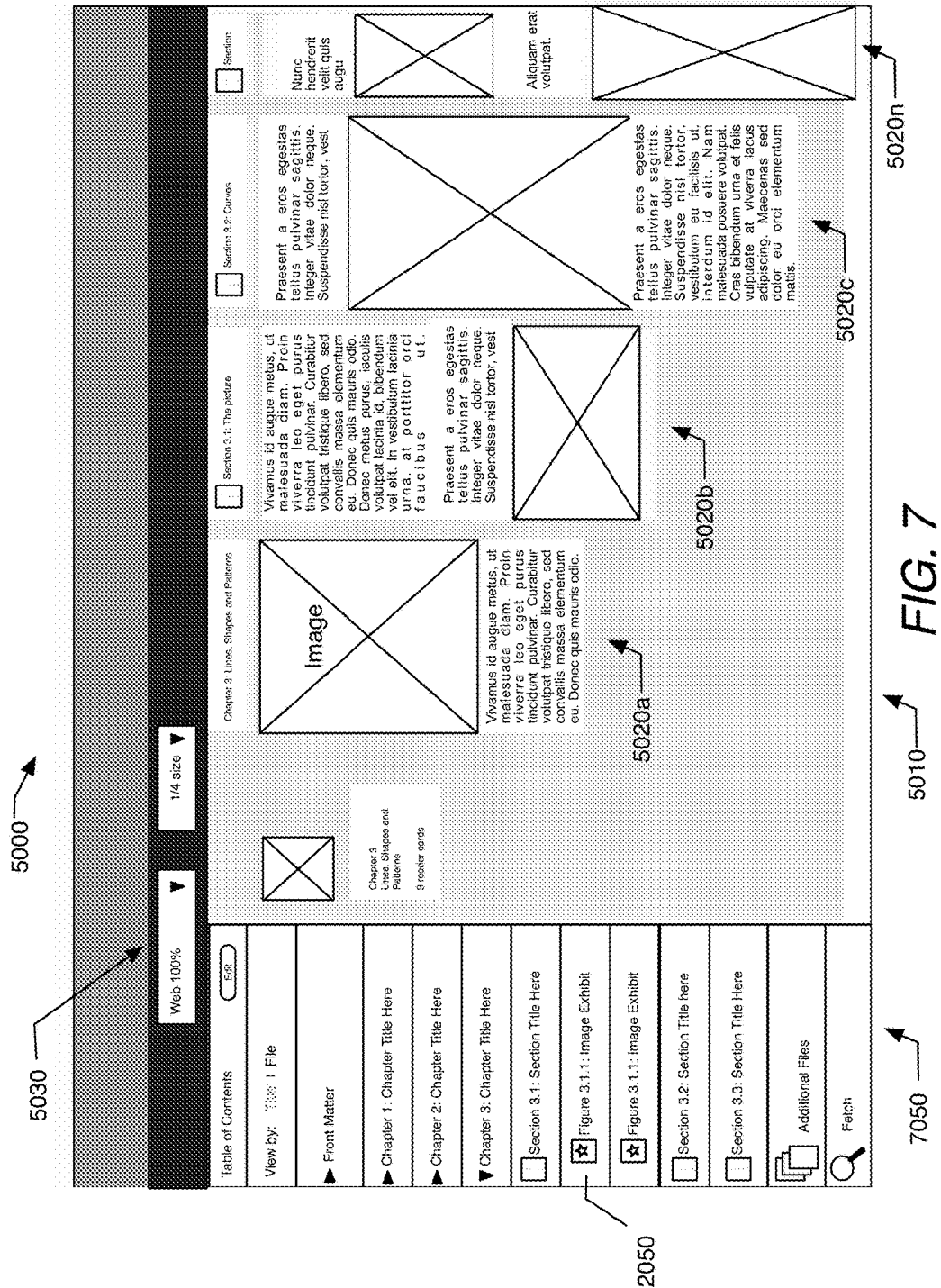
FIG. 7 illustrates an example of a chapter overview user interface.

FIG. 7 illustrates yet a further interface for use in creating and/or editing a digital content work. In this instance, user interface 5000 provides, in panel 5010, an overview of all cards 5020a-5020n in a selected portion of the digital content work. Shown is a chapter overview, but similar interfaces may be used for one or more chapters, sections, or even the entire digital content work, etc. Card actions, such as mode switching or revision toggling, may be invoked by selecting a top bar at the top of each card 5020a-5020n. Table of contents 2050 provides for navigation within the digital content work. Clicking on a chapter name provides an overview of all the cards in the chapter. Clicking on a small chevron to the left of a chapter name navigates directly to a specific card without invoking chapter overview.

Content viewing options 5030 provide the user the ability to view the cards as they would render for a given medium or target device and at a designated scale. This may be facilitated using the device simulators of integration component 1040. Since the digital content work may be targeted to multiple and disparate electronic device platforms, and since the content may not be rendered identically across disparate electronic device platforms, the use of such device simulators allows content contributors to view the content as it would appear for the particular desired target electronic device or medium.

Figure 8:
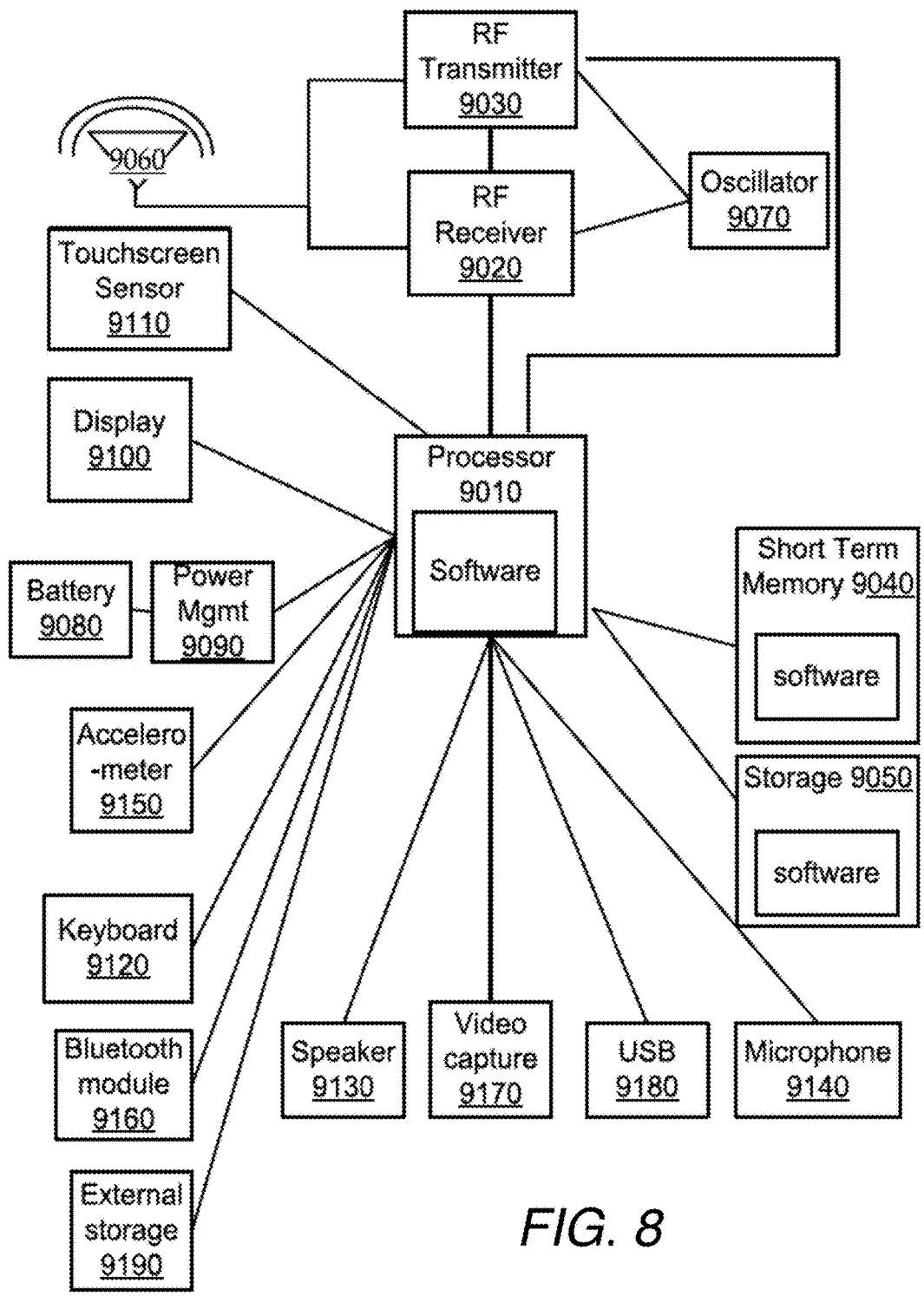
FIG. 8 shows a schematic of an electronic device, according to some examples of the present disclosure.

Publishing pipeline 1090 may build the digital content work for various electronic devices. Electronic devices may include any electronic device capable of processing the renderable digital content work and displaying it so as to properly convey the information, experiences, and idea expressions which are embodied in the electronic representation of the content in order to provide value for an end user. Examples of electronic devices include desktop computers, laptop computers, server computers, cellphones, smart phones, tablet computers, computer game consoles, portable computer gaming consoles, media players, portable media players, other mobile devices, and the like. FIG. 8 shows one example of such a device 9000 in the form of an electronic device. Processor 9010 controls the overall functions of the electronic device such as running applications and controlling peripherals. Processor 9010 may be any type of processor including RISC, CISC, VLIW, MISC, OISC, and the like. Processor 9010 may include a Digital Signal Processor ("DSP"). Processor 9010 may communicate with RF receiver 9020 and RF transmitter 9030 to transmit and receive wireless signals such as cellular, Bluetooth, and Wi-Fi signals. Processor 9010 may use short term memory 9040 to store operating instructions and help in the execution of the operating instructions such as the temporary storage of calculations and the like. Processor 9010 may also use non-transitory storage 9050 to read instructions, files, and other data that requires long term, non-volatile storage.

RF Receiver 9020 and RF Transmitter 9030 may send signals to the antenna 9060. RF transmitter 9030 contains all the necessary functionality for transmitting radio frequency signals via antenna 9060 given a baseband signal sent from Processor 9010. RF transmitter may contain an amplifier to amplify signals before supplying the signal to antenna 9060. RF transmitter 9030 and RF Receiver 9020 are capable of transmitting and receiving radio frequency signals of any frequency including, microwave frequency bands (0.3 to 70 GHz) which include cellular telecommunications, WLAN and WWAN frequencies. Oscillator 9070 may provide a frequency pulse to both RF Receiver 9020 and RF Transmitter 9030.

Device 9000 may include a battery or other power source 9080 with associated power management process or module 9090. Power management module 9090 distributes power from the battery 9080 to the other various components. Power management module 9090 may also convert the power from battery 9080 to match the needs of the various components. Power may also be derived from alternating or direct current supplied from a power network.

Processor 9010 may communicate and control other peripherals, such as LCD display 9100 with associated touch screen sensor 9110. Processor 9010 causes images to be displayed on LCD display 9100 and receives input from the touch screen sensor 9110 when a user presses on the touch-screen display. In some examples touch screen sensor 9110 may be a multi-touch sensor capable of distinguishing, and processing gestures.

Processor 9010 may receive input from a physical keyboard 9120. In other examples, the electronic device 9000 may utilize a touch screen keyboard using LCD display 9100 and touch screen sensor 9110. 9010 may produce audio output, and other alerts which are played on the speaker 9130. Speaker 9130 may also be used to play voices (in the case of a voice phone call) that have been received from RF receiver 9020 and been decoded by Processor 9010. Microphone 9140 may be used to transmit a voice for a voice call conversation to processor 9010 for subsequent encoding and transmission using RF Transmitter 9030. Microphone 9140 may also be used as an input device for commands using voice processing software. Accelerometer 9150 provides input on the motion of the device 9000 to processor 9010. Accelerometer 9150 may be used in motion sensitive applications. Bluetooth module 9160 may be used to communicate with Bluetooth enabled external devices. Video capture device 9170 may be a still or moving picture image capture device or both. Video Capture device 9170 is controlled by Processor 9010 and may take and store photos, videos, and may be used in conjunction with microphone 9140 to capture audio along with video. USB port 9180 enables external connections to other devices supporting the USB standard and charging capabilities. USB port 9180 may include all the functionality to connect to, and establish a connection with an external device over USB. External storage module 9190 may include any form of removable physical storage media such as a flash drive, micro SD card, SD card, Memory Stick and the like. External storage module 9190 may include all the functionality needed to interface with these media.

Certain embodiments are described herein as including logic or a number of components, modules, or mechanisms. Modules or components may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "platform as a service" (PaaS). For example, at least some of the operations may be performed by a group of computers (as examples of machines including processors), these operations being accessible via a network (e.g., the Internet) and via one or more appropriate interfaces (e.g., Application Program Interfaces (APIs)). Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC). The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
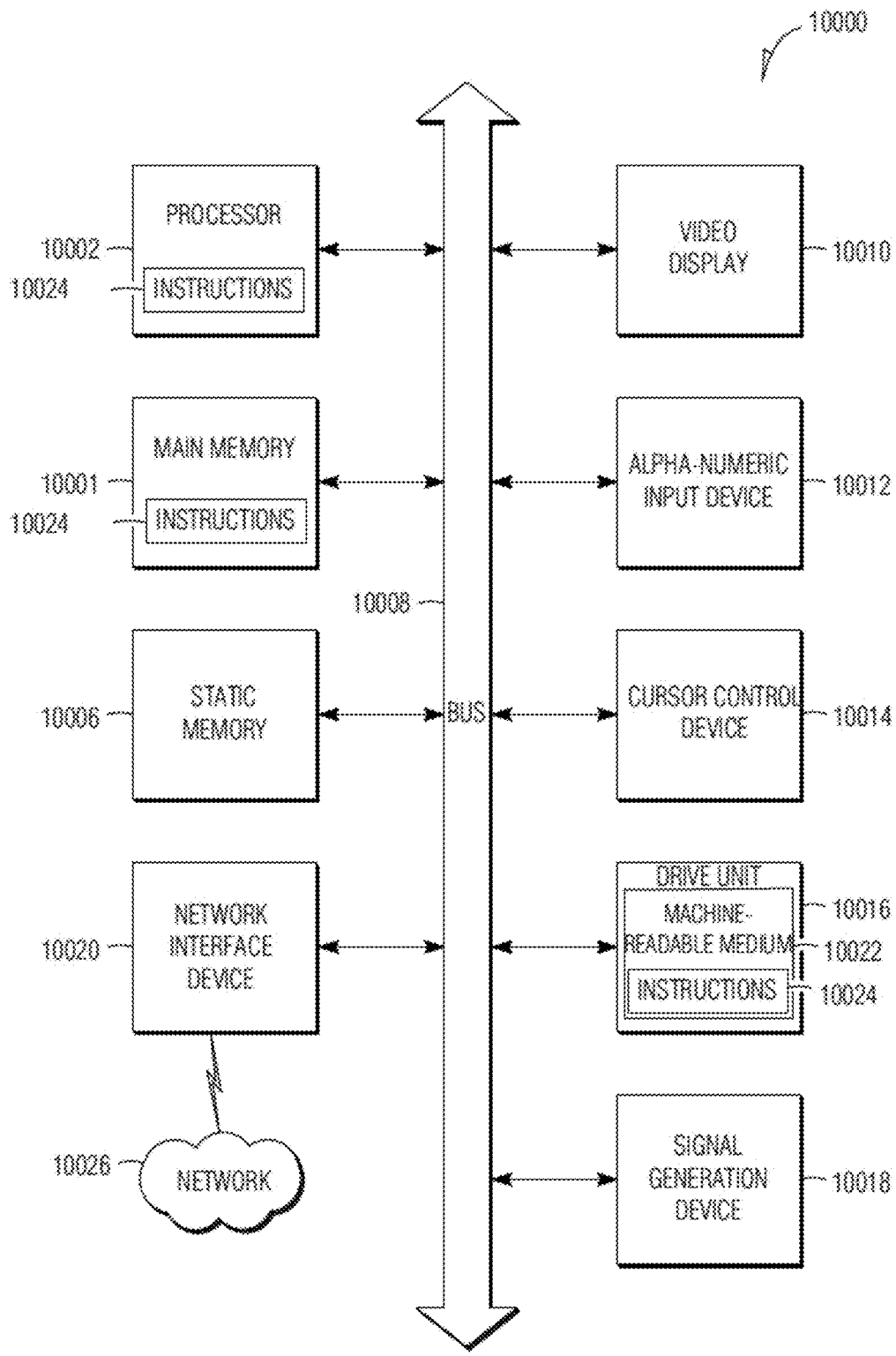
FIG. 9 shows an example of a machine, according to some examples of the present disclosure.

FIG. 9 shows a diagrammatic representation of a machine in the example form of a computer system 10000 within which a set of instructions for causing the machine to perform any one or more of the methods, processes, operations, or methodologies discussed herein may be executed. In some examples, the computer system 10000 may be or include components from the example device 9000. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 10000 includes a processor 10002 (e.g., a Central Processing Unit (CPU), a Graphics Processing Unit (GPU) or both), a main memory 10001 and a static memory 10006, which communicate with each other via a bus 10008. The computer system 10000 may further include a video display unit 10010 (e.g., a Liquid Crystal Display (LCD) or a Cathode Ray Tube (CRT)). The computer system 10000 also includes an alphanumeric input device 10012 (e.g., a keyboard), a User Interface (UI) cursor controller 10014 (e.g., a mouse), a disk drive unit 10016, a signal generation device 10018 (e.g., a speaker) and a network interface device 10020 (e.g., a transmitter).

The disk drive unit 10016 includes a machine-readable medium 10022 on which is stored one or more sets of instructions 10024 and data structures (e.g., software) embodying or used by any one or more of the methodologies or functions illustrated herein. The software may also reside, completely or at least partially, within the main memory 10001 and/or within the processor 10002 during execution thereof by the computer system 10000, the main memory 10001 and the processor 10002 also constituting machine-readable media.

The instructions 10024 may further be transmitted or received over a network 10026 via the network interface device 10020 using any one of a number of well-known transfer protocols (e.g., HTTP, Session Initiation Protocol (SIP)).

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be stored on one or more non-transitory computer-readable media during execution or at other times. These non-transitory computer-readable media may include, but are not limited to, solid state memories, magnetic and/or optical disks, Random Access Memories (RAMs), Read Only Memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description.

What is claimed is:

1. A system comprising:
   one or more memories storing instructions and one or more processors in communication with the one or more memories configured, when executing the instructions, to:
   provide to content contributors a graphical user interface for a content creation and editing platform, said user interface including one or more content viewing and editing tools to create a target platform-independent representation of a digital content work, said content viewing and editing tools including:

a. one or more tools configured to provide simulated representations of the digital content work in appearance and function for each of a plurality of target devices or media,
   b. editing tools configured to permit content creators to define a plurality of reusable patterns defining portions of a markup language representation of the digital content work, and store the patterns in a pattern library, wherein each of the plurality of reusable patterns is a configurable snippet of markup language; and
   c. tools for producing a plurality of target platform-dependent representations of the digital content work from the target platform-independent representation of the digital content work, each target platform-dependent representation being for display on a respective one of the plurality of target devices or media, wherein each of the plurality of target platform-dependent modules is produced based on a corresponding one of a plurality of profiles for each target device or medium, said profiles specifying capabilities of the respective target device or medium, and the target platform-dependent representations of the digital content work are formatted so as to be compliant with profile-specified capabilities of the respective target device or medium by removing, resizing, or replacing non-compliant portions of the target platform-independent representation of the digital content work;

display, in a first viewing area of the user interface, a static digital representation of the digital content work, and display concurrently in a second viewing area of the user interface a navigator for use in creating the markup language representation of the digital content work from the static digital representation of the digital content work by specifying mappings of portions of content from the static digital representation of the content work to one or more patterns defining the markup language representation of the digital content work;

receive from a user editing instructions concerning the markup language representation of the digital content work, and display in a direct editing viewer of the user interface results of executing said editing instructions to said contents of the markup language representation of the digital content work, said instructions including drag and drop selection of one or more of the patterns from the pattern library into the markup language representation of the digital content work;

responsive to a user operation, display in a what-you-see-is what-you-get (WYSIWYG) visual editor of said user interface and in an editable form metadata concerning the markup language representation of the digital content work, said metadata being displayed in context with markup language objects of the markup language representation of the digital content work described by the metadata; and responsive to user input, create one or more of the target platform-dependent representations of the digital content work from the target platform-independent representation of the digital content work by one or more of: altering behavior or appearance of media objects, changing layout of text, reformatting images, video or audio, and removing content in the target platform-independent representation of the digital content work, to reflect profile-specified capabilities of the respective target devices or media so as to be compliant with the profile-specified capabilities of the respective target devices or media.

2. The system of claim 1, wherein the one or more processors are configured to produce one or more of the target platform-dependent representations of the digital content work by including device-specific renderable objects in the one or more of the target platform-dependent representations of the digital content work.

3. The system of claim 1, wherein one or more of the target platform-dependent representations of the digital content work include cross-platform compatible objects renderable by multiple ones of the target devices.

4. The system of claim 1, wherein the plurality of reusable patterns is platform-agnostic.

5. The system of claim 1, wherein one or more of the plurality of reusable patterns includes semantic metadata describing the respective content of the pattern in terms of its substance rather than its form or appearance.

6. The system of claim 1, wherein one or more of the plurality of reusable patterns is configured by a content creator.

7. The system of claim 1, wherein the content viewing and editing tools provide a viewing mode in which conditionally hidden content is displayed for proofing.

* * * * *